(12) United States Patent
Lim

(10) Patent No.: US 7,908,323 B2
(45) Date of Patent: Mar. 15, 2011

(54) ENTERPRISE KNOWLEDGE AND INFORMATION ACQUISITION, MANAGEMENT AND COMMUNICATIONS SYSTEM WITH INTELLIGENT USER INTERFACES

(75) Inventor: Jeffrey Cheong Kee Lim, Singapore (SG)

(73) Assignee: Pi Eta Consulting Company Pte. Ltd., Singapore (SG)

( * ) Notice: Subject to any disclaimer, the term of this patent is extended or adjusted under 35 U.S.C. 154(b) by 1062 days.

(21) Appl. No.: 10/507,656

(22) PCT Filed: May 14, 2002

(86) PCT No.: PCT/SG02/00088
§ 371 (c)(1),
(2), (4) Date: Apr. 23, 2009

(87) PCT Pub. No.: WO04/001648
PCT Pub. Date: Dec. 31, 2003

(65) Prior Publication Data
US 2009/0204674 A1 Aug. 13, 2009

(30) Foreign Application Priority Data
Mar. 11, 2002 (SG) .................... 0201310-0

(51) Int. Cl.
*G06F 15/16* (2006.01)
(52) U.S. Cl. ........ 709/205; 709/206; 717/101; 717/178; 715/781; 715/861; 715/764; 715/770; 715/247
(58) Field of Classification Search .......... 709/203–205, 709/206
See application file for complete search history.

(56) References Cited

U.S. PATENT DOCUMENTS

| 5,208,748 A | * | 5/1993 | Flores et al. ............... 704/1 |
| 5,573,924 A |   | 11/1996 | Beckmann et al. |
| 6,003,137 A |   | 12/1999 | Kawasaki |
| 6,214,345 B1 |  | 4/2001 | Firestone et al. |
| 6,342,219 B1 |  | 1/2002 | Thorpe et al. |

(Continued)

FOREIGN PATENT DOCUMENTS

JP 2001 344400 A 12/2001

(Continued)

OTHER PUBLICATIONS

PCT International Search Report for PCT/SG02/00088 dated Jun. 28, 2002.

(Continued)

*Primary Examiner* — Jude J Jean Gilles
(74) *Attorney, Agent, or Firm* — Sawyer Law Group, P.C.

(57) ABSTRACT

A system for acquiring, sharing and managing information in an organization is disclosed hereinafter. The system involves a network communicator for connecting to a network through which users accesses the system, and a document manager through which a user provides a document for access by at least one other user through the network. The system also involves electronic conversing means for enabling a user to correspond with at least one other user through the network using an electronic conversation format for generating an electronic conversation record, and an archive for storing at least one of documents provided through the document manager and electronic conversation record conducted using the electronic conversing means. In the system, a keyword representative of the at least one of documents and electronic conversation record is stored in the archive in association with the stored at least one documents and electronic conversation record.

18 Claims, 15 Drawing Sheets

U.S. PATENT DOCUMENTS

| | | | | |
|---|---|---|---|---|
| 6,405,179 | B1 * | 6/2002 | Rebane | 705/36 R |
| 6,884,869 | B2 | 4/2005 | Senter et al. | |
| 7,089,278 | B1 * | 8/2006 | Churchill et al. | 709/203 |
| 2001/0007332 | A1 | 7/2001 | Andreas et al. | |
| 2002/0013759 | A1 | 1/2002 | Dalal et al. | |
| 2003/0083263 | A1 | 5/2003 | Doronina et al. | |
| 2003/0096743 | A1 | 5/2003 | Senter et al. | |
| 2003/0130189 | A1 | 7/2003 | Senter et al. | |
| 2004/0157782 | A1 | 8/2004 | Doronina et al. | |
| 2005/0113308 | A1 | 5/2005 | Senter et al. | |
| 2005/0118656 | A1 | 6/2005 | Terrett | |
| 2005/0123547 | A1 | 6/2005 | Terrett | |
| 2005/0238649 | A1 | 10/2005 | Doronina et al. | |

FOREIGN PATENT DOCUMENTS

| | | |
|---|---|---|
| JP | 2002 049729 A | 2/2002 |
| WO | WO 00/13122 A1 | 3/2000 |
| WO | WO 02/088172 A2 | 11/2002 |
| WO | WO 03/026577 A2 | 4/2003 |
| WO | WO 03/046581 A2 | 6/2003 |
| WO | WO 2005/081711 A2 | 9/2005 |

OTHER PUBLICATIONS

Agathanggelou et al., "Expression of immune regulatory molecules in Epstein-Barr virus-associated nasopharyngeal carcinomas with prominent lymphoid stroma. Evidence for a functional interaction between epithelial tumor cells and infiltrating lymphoid cells," *Am J. Pathol.*, 147(4):1152-1160 (1995).

Agematsu et al., "Generation of plasma cells from peripheral blood memory B cells: synergistic effect of interleukin-10 and CD27/CD70 interaction," *Blood*, 91(1):173-180 (1998).

Agematsu et al., "B cell subpopulations separated by CD27 and crucial collaboration of CD27+ B cells and helper T cells in immunoglobulin production," *Eur. J. Immunol.*, 27(8):2073-2079 (1997).

Akiba et al., "Critical contribution of OX40 ligand to T helper cell type 2 differentiation in experimental leishmaniasis," *J. Exp. Med.*, 191(2):375-380 (2000).

Bahler et al., "Clonal evolution of a follicular lymphoma: evidence for antigen selection," *PNAS*, 89(15):6770-6774 (1992).

Bahler et al., "Antigen selection in human lymphomagenesis," *Cancer Res.*, 52(19 Suppl.):5547s-5551s (1992).

Bowman et al., "The cloning of CD70 and its identification as the ligand for CD27," *J. Immunol.*, 152(4):1756-1761 (1994).

Brugnoni et al., "CD70 expression on T-cell subpopulations: study of normal individuals and patients with chronic immune activation," *Immunol. Lett.*, 55(2):99-104 (1997).

De Jong et al., "Regulation of expression of CD27, a T cell-specific member of a novel family of membrane receptors," *J. Immunol.*, 146(8):2488-2494 (1991).

Den Haan et al., "Identification of a graft versus host disease-associated human minor histocompatibility antigen," *Science*, 268(5216):1476-1480 (1995).

Dillman, R. O., "Monoclonal Antibodies for Treating Cancer," *Ann. Int. Med.*, 111:592-603 (1989).

Giralt et al., "Leukemia relapse after allogeneic bone marrow transplantation: a review," *Blood*, 84(11):3603-3612 (1994).

Goodwin et al., "Molecular and biological characterization of a ligand for CD27 defines a new family of cytokines with homology to tumor necrosis factor," *Cell*, 73(3):447-456 (1993).

Gravestein et al., "Cloning and expression of murine CD27: comparison with 4-1BB, another lymphocyte-specific member of the nerve growth factor receptor family," *Eur. J. Immunol.*, 23(4):943-950 (1993).

Gravestein et al., "Novel mAbs reveal potent co-stimulatory activity of murine CD27," *Int. Immunol.*, 7(4):551-557 (1995).

Gruss et al., "Pathophysiology of Hodgkin's disease: functional and molecular aspects," *Baillieres Clin. Haematol.*, 9(3):417-446 (1996).

Held-Feindt et al., "CD70/CD27 ligand, a member of the TNF family, is expressed in human brain tumors," *Int. J. Cancer*, 98(3):352-356 (2002).

Hintzen et al., "CD70 represents the human ligand for CD 27," *Int. Immunol.*, 6(3):477-480 (1994).

Hintzen et al., "Characterization of the human CD27 ligand, a novel member of the TNF gene family," *J. Immunol.*, 152(4):1762-1773 (1994).

Hintzen et al., "CD27: marker and mediator of T-cell activation?," *Immunol. Today*, 15(7):307-311 (1994).

Hintzen et al., "Engagement of CD27 with its ligand CD70 provides a second signal for T cell activation," *J. Immunol.*, 154(6):2612-2623 (1995).

Hintzen et al., "Regulation of CD27 expression on subsets of mature T-lymphocytes," *J. Immunol.*, 151(5):2426-2435 (1993).

Hintzen et al., "A soluble form of the human T cell differentiation antigen CD27 is released after triggering of the TCR/CD3 complex," *J. Immunol.*, 147(1):29-35 (1991).

Hishima et al., "CD70 expression in thymic carcinoma," *Am. J. Surg. Pathol.*, 24(5):742-746 (2000).

Jacquot et al., "CD154/CD40 and CD70/CD27 interactions have different and sequential functions in T cell-dependent B cell responses: enhancement of plasma cell differentiation by CD27 signaling," *J. Immunol.*, 159(6):2652-2657 (1997).

Kobata et al., "CD27-CD70 interactions regulate B-cell activation by T cells," *PNAS*, 92(24):11249-11253 (1995).

Lens et al., "Aberrant expression and reverse signaling of CD70 on malignant B cells," *Br. J. Haematol.*, 106(2):491-503 (1999).

Lens et al., "Phenotype and function of human B cells expressing CD70 (CD27 ligand)," *Eur. J. Immunol.*, 26(12):2964-2971 (1996).

Lens et al., "Antigen-presenting cell-derived signals determine expression levels of CD70 on primed T cells," *Immunol.*, 90:38-45 (1997).

Lens et al., "Control of lymphocyte function through CD27-CD70 interactions," *Semin Immunol.*, 10(6):491-499 (1998).

Locksley et al., "The TNF and TNF receptor superfamilies: integrating mammalian biology," *Cell*, 104(4):487-501 (2001).

Maurer et al., "CD27 expression by a distinct subpopulation of human B lymphocytes," *Eur. J. Immunol.*, 20(12):2679-2684 (1990).

Nakajima et al., "Involvement of CD70-CD27 interactions in the induction of experimental autoimmune encephalomyelitis," *J. Neuroimmunol.*, 109(2):188-196 (2000).

Nakajima et al., "Roles of IL-4 and IL-12 in the development of lupus in NZB/W F1 mice," *J. Immunol.*, 158(3):1466-1472 (1997).

Orengo et al., "Reciprocal expression of CD70 and of its receptor, CD27, in human long term-activated T and natural killer (NK) cells: inverse regulation by cytokines and role in induction of cytotoxicity," *Clin. Exp. Immunol.*, 107(3):608-613 (1997).

Oshima et al., "Characterization of murine CD70 by molecular cloning and mAb," *Int. Immunol.*, 10(4):517-526 (1998).

Peitsch et al., "Comparative molecular modeling of the Fas-ligand and other members of the TNF family," *Mol. Immunol.*, 32(10):761-772 (1995).

Smith et al., "A receptor for tumor necrosis factor defines an unusual family of cellular and viral proteins," *Science*, 248(4958):1019-1023 (1990).

Stein et al., "A5 Cluster Report: CDw70," pp. 446-449 from *Leucocyte Typing IV White Cell Differentiation Antigens*, Knapp, eds., Oxford University Press, 1989.

Sugita et al., "Participation of the CD27 antigen in the regulation of IL-2-activated human natural killer cells," *J. Immunol.*, 149(4):1199-1203 (1992).

Tesselaar et al., "Characterization of murine CD70, the ligand of the TNF receptor family member CD27," *J. Immunol.*, 159(10):4959-4965 (1997).

Van Lier et al., "Tissue distribution and biochemical and functional properties of Tp55 (CD27), a novel T cell differentiation antigen," *J. Immunol.*, 139(5):1589-1596 (1987).

Wischhusen et al., "Identification of CD70-mediated apoptosis of immune effector cells as a novel immune escape pathway of human gliblastoma," *Cancer Res.*, 6299):2592-2599 (2002).

Witzig et al., "Radioimmunotherapy for patienhts with relapsed B-cell non-Hodgkin lymphoma," *Cancer Chemother. Pharmacol.*, 48(suppl. 1):S91-S95 (2001).

\* cited by examiner

ENTERPRISE KNOWLEDGE AND INFORMATION ACQUISITION, MANAGEMENT AND COMMUNICATIONS SYSTEM WITH INTELLIGENT USER INTERFACES

BACKGROUND

Knowledge and information derivable from employees within an organization are often undervalued key resources. The risk in improperly managing these resources is usually underestimated and its impact not felt until the people holding the requisite knowledge to ensure that certain processes run smoothly within the organization leave. Sometimes, an organization may also be unaware of lost opportunities to benefit from the knowledge of its people, or for that matter knowledge in general, because of a lack of an open support system that encourages the sharing of expertise and know-how to other members within the organization.

There is clearly a need for a system for acquiring, sharing and managing knowledge and information within an organization.

SUMMARY

In accordance with a first aspect of the invention, a system for acquiring, sharing and managing information in an organization is disclosed hereinafter. The system comprises a network communicator for connecting to a network through which users accesses the system, and a document manager through which a user provides a document for access by at least one other user through the network. The system also comprises electronic conversing means for enabling a user to correspond with at least one other user through the network using an electronic conversation format for generating an electronic conversation record, and an archive for storing at least one of documents provided through the document manager and electronic conversation record conducted using the electronic conversing means. In the system, a keyword representative of the at least one of documents and electronic conversation record is stored in the archive in association with the stored at least one of documents and electronic conversation record.

In accordance with a second aspect of the invention, a method for acquiring, sharing and managing information in an organization via an enterprise system is disclosed hereinafter. The method comprises the steps of connecting the system to a network through which users accesses the system, and enabling a user to provide a document for access by at least one other user through the network. The method also comprises the steps of enabling a user to correspond with at least one other user through the network using an electronic conversation format for generating an electronic conversation record, and storing at least one of documents provided through the document manager and electronic conversation record generated using the electronic conversing means. In the method, a keyword representative of the at least one of documents and electronic conversation record is stored in association with the stored at least one of documents and electronic conversation record.

In accordance with a third aspect of the invention, a computer program product comprising a computer usable medium having computer readable program code means embodied in the medium for acquiring, sharing and managing information in an organization via an enterprise system is disclosed hereinafter. The computer program product comprises computer readable program code means for connecting the system to a network through which users access the system, and computer readable program code means for enabling a user to provide a document for access by at least one other user through the network. The computer program product also comprises computer readable program code means for enabling a user to correspond with at least one other user through the network using an electronic conversation format for generating an electronic conversation record and computer readable program code means for storing at least one of documents provided through the document manager and electronic conversation record generated using the electronic conversing means. Accordingly, a keyword representative of the at least one of documents and electronic conversation record is stored in association with the stored at least one of documents and electronic conversation record.

BRIEF DESCRIPTION OF DRAWINGS

Embodiments of the invention are described hereinafter with reference to the drawings, in which.

DETAILED DESCRIPTION

A system according to an embodiment of the invention is described hereinafter for addressing the need for a system for acquiring, sharing and managing knowledge and information within an organization. Such a system advantageously provides new economy users with the ability to harness and manage knowledge and information resources. This system provides guidance to users throughout various knowledge and information management processes, hereinafter known as system processes, using a Guidance Subsystem.

The system is known as a multi-tier enterprise Knowledge and Information Management System. The system comprises a number of modules and subsystems and provides organizations with a Knowledge and Information Management Framework which can be utilized to address the foregoing issues on an enterprise-wide basis. The system includes a Document Management Module, a Directory Management Module, a Group Talk Module, and a Financial. Markets Module. The system also includes a Guidance Subsystem and a Security Support Subsystem. The various modules are essentially functional applications or programs providing users with various system functions. The subsystems are supporting applications or programs which are dependent on the modules and provide customized services to users of the modules, since different modules have different output and/or input fields.

System Environment

Figure 1:
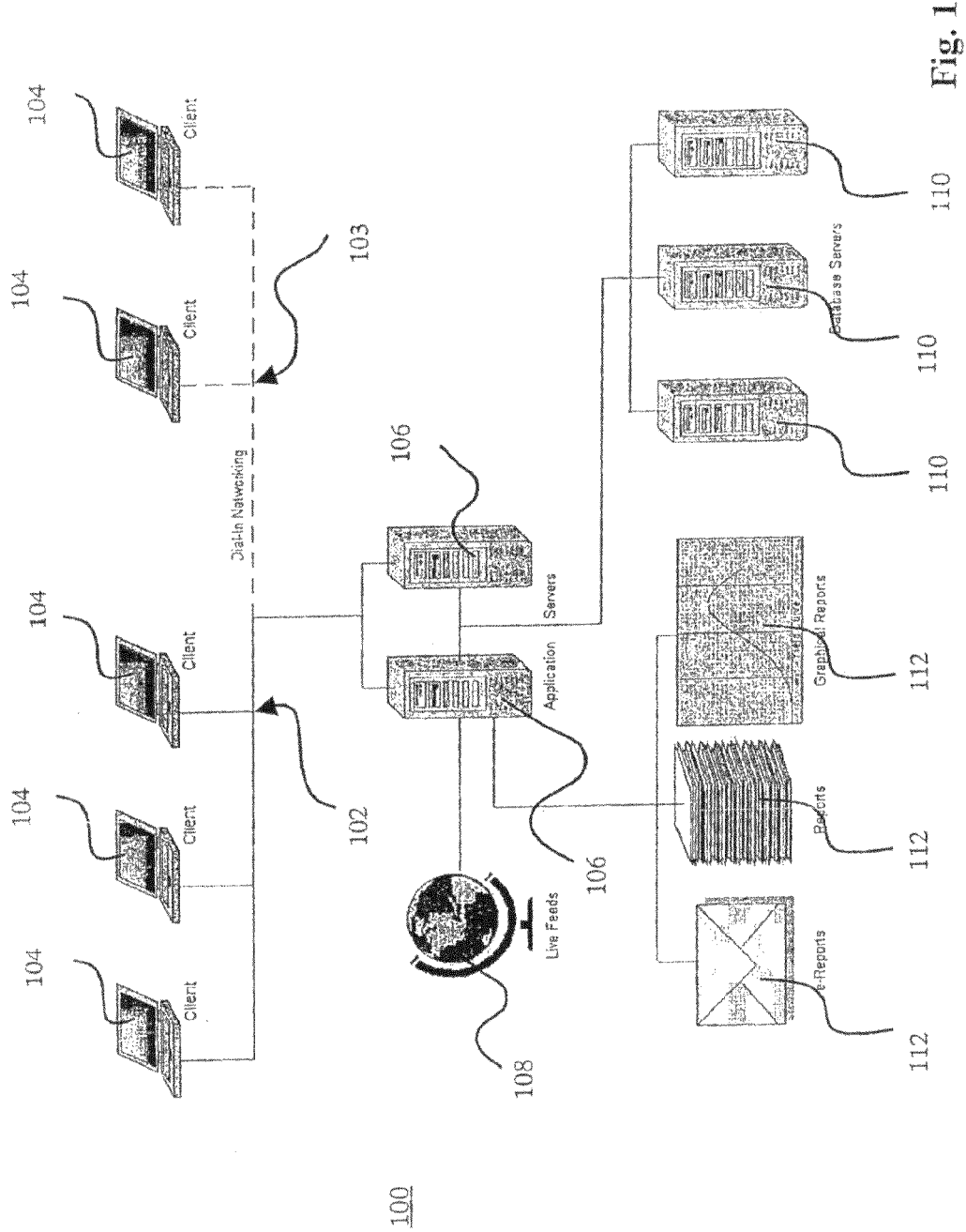
FIG. 1 is a block diagram of a network environment 100 in which a system according to an embodiment of the invention operates.

The system described hereinafter with reference to FIGS. 1 to 16 preferably operates in a network environment 100 as shown in FIG. 1. The network environment typically comprises an enterprise communication network 102 with dial-in networking capability 103, user computers 104 connected to the system through the enterprise communication network 102, service and connection host computers and application servers 106, gateways 108 to other networks for providing live feeds, database servers 110 for managing and hosting a system database, and software executed on the various computers including report generating software 112. Internet connections and wireless communications may be used in such a network environment.

Many different communication protocols may be employed in facilitating communications between the various parts of the network environment, such as TCP/IP, X.25, ISDN, Ethernet, asynchronous line protocols and analog and/or digital voice transmission. Also, where appropriate, authentication and encryption protocols are employed, for example, hypertext transfer protocol (HTTP) or secure socket layer (SSL) protocol.

Guidance Subsystem

The Guidance Subsystem is for providing full on-line guidance and handholding of users through the various system processes. When the system processes are performed, a user would usually be required to enter inputs, provide information, and etc. The guidance subsystem however breaks all system processes down into parts wherever possible and prioritizes such process parts. For inputs that are not required or disallowed, the guidance subsystem prevents users from changing pre-sets for example. For inputs which are allowed and required, the guidance subsystem then provides help through a full on-line HELP feature (like HTML Help for example) to allow users to understand what inputs they need to provide and how they can provide the requisite inputs. As such it is considered a tactically designed online guidance subsystem with a full HELP feature in the background.

Document Management Module

The Document Management Module is a module in the system that allows users to create or capture and store all types of text and graphic documents for future usage such as search and retrieval. When documents are first created, they have to be categorized according to Topic, Sub-Topic and/or Title which are already created, or be created by a user known as a Document Creator if Topic, Sub-Topic, and/or Title do not exist. In the Document Creation Process, for the case of text documents, the system provides an auto-generated list of keywords, which can be edited by the Document Creator, before being saved together with the text document. In the case of graphic documents, the Document Creator has to manually provide the keywords to the system. The keywords saved together with the documents provide for easy search and retrieval of desired documents later on when users need to search for required documents.

A Document Creator creates a Document Record and users can search for desired archived Document Records according to Topic, Sub-Topic and/or Title by providing the system with the keyword(s) to use in system search processes such as the sophisticated Boolean search process. A Document Record is an entirely electronic record containing a created and archived document, which includes a graphic, text, or multi-media document, system generated keywords associated with the document which are used in a system search process, and User Access Rights definitions to the document. User Access Rights determine which users can access the document and the type of access allowed, for example read-only, read and update. Only authorized users may view Document Records. If a user does not have the authorization and wishes to view a particular Document Record, the user can request the Document Creator or a system administrator, hereinafter known as the Administrator, to provide the user with the requisite rights to view the record.

Directory Management Module

The Directory Management Module is a module that allows users to capture and store directory information on all types of companies and/or individuals in records for future usage such as search and retrieval. The system requires the capture of the following directory information fields within each record by a user known as a Directory Record Creator, namely Company Name, Contact Person and Designation in a Directory Record Creation Process. In this process, the Director Record Creator also captures additional fields pertaining to the Contact Person and these include the Contact Person's Full Name, Address, Contact Telephone and Facsimile Numbers and Email Addresses. A Directory Record is an entirely electronic record containing created and archived directory information of a company and User Access Rights definitions to the Directory Record. User Access Rights determine which users can access the Directory Record and the type of access allowed such as read-only, read and update.

A Directory Search Process will then use the above captured fields within each of the Directory Records to search for desired records. The system uses the sophisticated Boolean logic search process that allows its users to specify certain logical conditions in the Directory Search Process.

Group Talk Module

The Group Talk Module allows users to engage in electronic conference calls conducted via the enterprise communication network 102 and archive the respective electronic conversations. At the initiation of each Group Talk Process, a user known as a Group Talk Initiator has to provide the system with Topic, Sub-Topic and/or Title in relation to the Group Talk. The Group Talk Module then allows user rights to be set by the Group Talk Initiator for specifying which users are allowed into a Group Talk. These users will then be alerted by the system that they need to go on-line to join the Group Talk. All conversations are typed into the system and are readable by all participating members in the Group Talk in a manner similar to a conference call facility. The major advantage of this is that the entire conversation is then archived into the system database as a Group Talk Record for future reference. The system will, as in the case of the Document Management Module, provide an auto-generated list of keywords, which can be edited by the Group Talk Initiator, before being saved together with the Group Talk Record. The system also automatically sets the archived Group Talk Record to read-only status for all participating Group Talk members. This security level is set to prevent tampering and preserve authenticity of the archived Group Talk Record. Only Group Talk members involved in the conversation have an automatic right to read the archived Group Talk Record. However, the Group Talk initiator can also assign read-only rights to other users if necessary.

Users can search for desired archived Group Talk Record s by Topic, Sub-Topic and/or Title by providing the system with the keyword(s) to use in a search process. Only authorized users may view Group Talk Record s. If a user does not have the authorization and wishes to view a particular Group Talk Record, the user can request the Group Talk Initiator or an authorized Group Talk Administrator or the Administrator to provide the user with the requisite rights to view the record.

It is possible to extend Group Talk to include other electronic communications formats that can be archived using transformation technology such as teleconference calls.

Financial Markets Module

In addition, the system also provides the Financial Markets Module to allow organizations that are actively engaged in the financial markets to better manage financial data and information. The Financial Markets Module allows users to capture and archive key financial market instrument prices and information in the various financial markets, including: Interest Rate Markets; Foreign Exchange Markets; Equity Markets; and Commodity Markets. Other key financial market segments can be added to the capability of the system as such markets evolve.

In the case of Interest Rate Markets, in addition to capturing and archiving the financial data and information for it, the system also uses the data captured to process and generate Yield and Discount Factor Curves for the various currencies captured within the system database. The Discount Factor Curves are especially useful for analyzing future cash flow from a present value perspective.

The system also provides users with the ability to create graphs and analyze historical data on financial instrument prices and related implied market rates from the data captured.

System Processes

System processes performed in the system in relation to the various modules and subsystems include Document Creation And Storage Process, Document Search And Retrieval Process, Directory Record Creation And Storage Process, Directory Record Search And Retrieval Process, Group Talk Capturing And Storage Process, Group Talk Record Search And Retrieval Process, Financial Instruments Data Capture And Storage Process, and Financial Data Search And Retrieval Process.

Document Creation and Storage Process

The Document Management Module is a module that allows users to create or capture and store all types of text and graphic documents for future usage such as search and retrieval.

Figure 2:
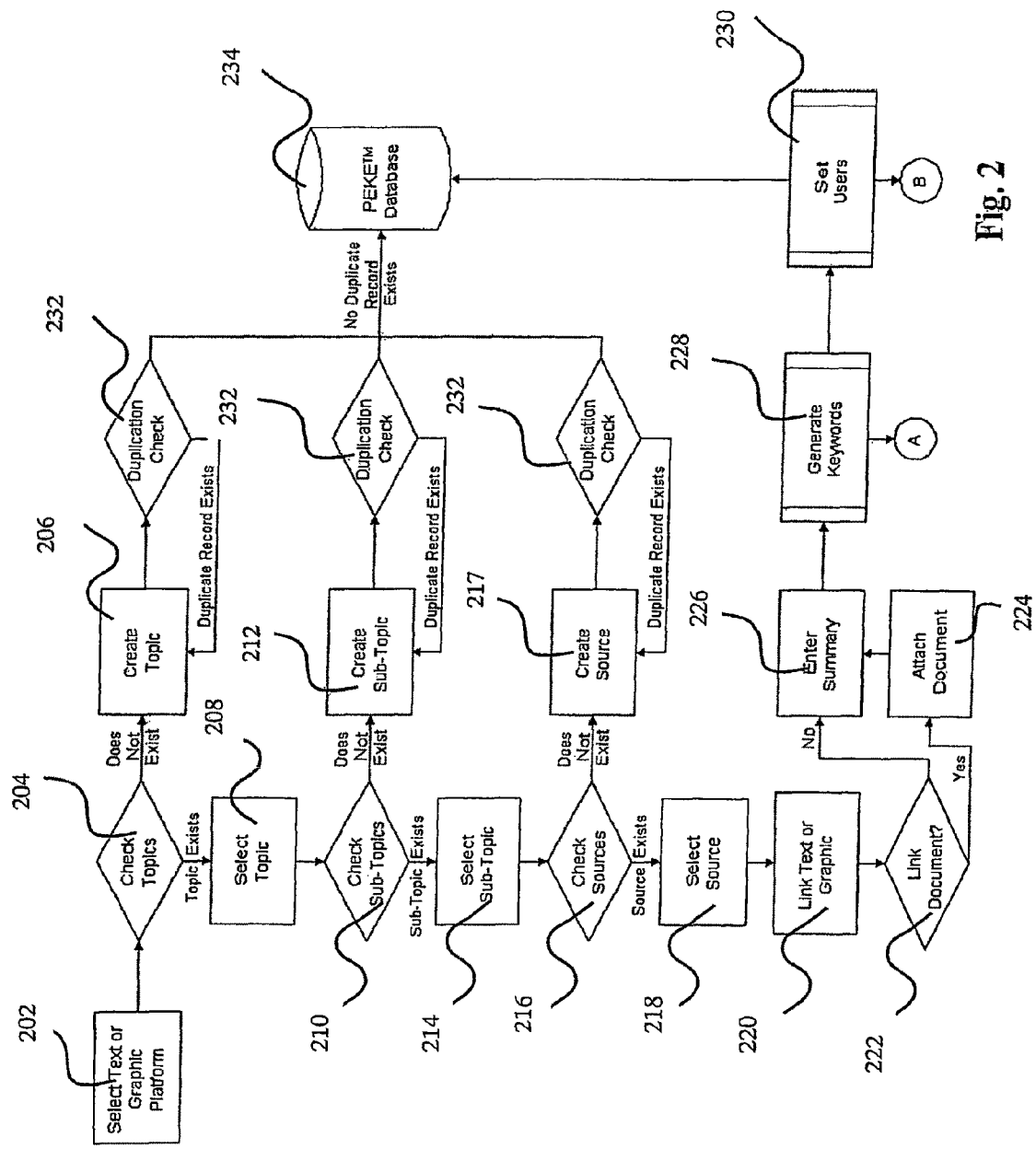
FIG. 2 is a flowchart for a Document Creation and Storage Process performed in the system of FIG. 1.

With reference to the flowchart in FIG. 2, the Document Creation and Storage Process is described hereinafter. To begin using the Document Management Module, the user should first classify the document into the document type to be created or captured by selecting a Document Creation Platform in a step 202. If the document to be created or captured is a text-type document, then the user should choose Text Capturing Platform. On the other hand, if the document to be created or captured is a graphic-type document, then the user should choose Graphic Capturing Platform.

Once the relevant Document Creation Platform has been chosen accordingly, the user then has to select a Topic to which the document could be classified under in a step 204. If no relevant Topic exists, then the user has to first exit the current Document Creation Platform, go to a "Main Document List Input" screen to create the desired Topic accordingly in a step 206 before proceeding with the Document Creation Process.

Returning to the previously chosen Document Creation Platform, the user should then choose the relevant Topic that the about-to-be-created document record belongs to in a step 208.

The user then has to select a Sub-Topic to which the document could be classified under in a step 210. If no relevant Sub-Topic exists, then the user has to first exit the current Document Creation Platform, go to the "Main Document List Input" screen to create the desired Sub-Topic accordingly in a step 212 before proceeding with the Document Creation and Storage Process.

Returning to the Document Creation Platform, the user should then choose the relevant Sub-Topic that the about-to-be-created document record belongs to in a step 214. A descriptive Title should then be added providing some details about the document-to-be-created. The user should also indicate a Source for the document record in a step 218 and if no relevant Source exists, then the user has to exit the current Document Creation Platform, go to the "Main Document List Input" screen to create the desired Source accordingly in a step 217 before proceeding with the Document Creation and Storage Process.

Figure 3:
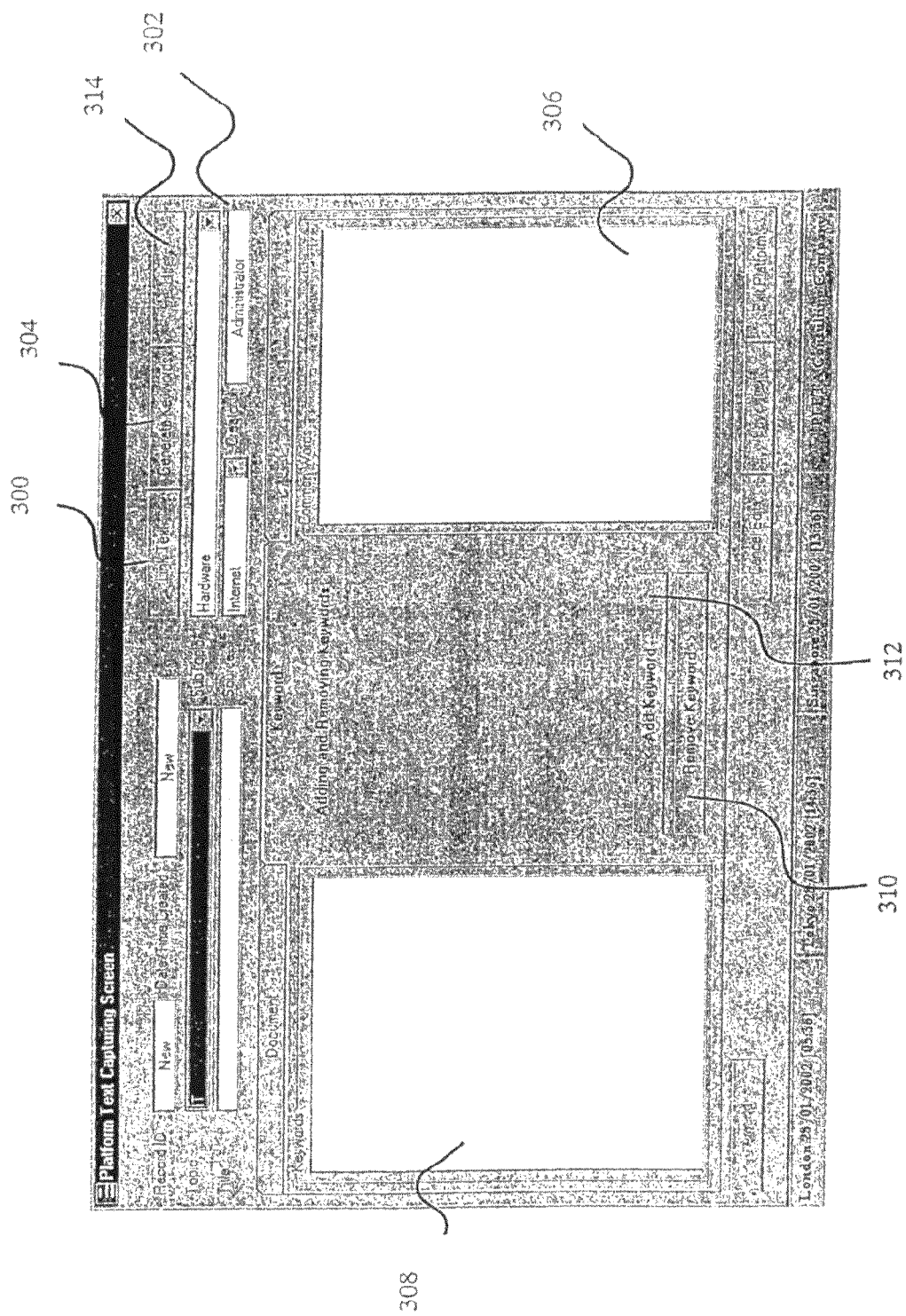
FIG. 3 is a screen shot of a Platform Text Capturing screen provided by the system of FIG. 1.

Once the above processes have been completed, the user can then choose in steps 220, 222, and 224 either to link a text or graphic document to the record being created by clicking on a "Link Text" button 300 appearing on the top right of the "Platform Text Capturing" screen 302 as shown in FIG. 3 or a "Link Graphic" button appearing on the top right of the "Platform Graphic Capturing" screen (not shown), respectively, depending on which screen was previously chosen by the user for the Document Creation and Storage Process. If no text or graphic document is to be linked to the record, the user may proceed directly to provide a typed summary of the record being created in a step 226. The latter case is chosen when users wish to use the Document Creation Platform to directly create a new text document record. In the case of graphic document records, users have to click the "Link Graphic" button before proceeding to provide a summary of the graphic document record being captured.

Thereafter, the system then proceeds to a Keywords Generation Process 228 and thereafter a Set Users Process 230. Additionally, when the user has to create the desired Topic, Sub-Topic and Source respectively in steps 206, 212 and 217, the system thereafter performs a duplication check in a step 232 which is followed by a step 234 to store the created Topic, Sub-Topic and Source in the system database if there is no duplication.

A previously disabled "Generate Keywords" button 304 is now enabled and the user has to click on this button to continue using the Document Management Module. Such a control process is advantageously implemented because the system adopts a systematic processing methodology to prevent users from making unnecessary mistakes by ensuring that process steps are carried out systematically and those steps which are not to be carried out at a particular point in the processing are disabled, whilst at the same time providing users with the Guidance Subsystem, which includes a full on-line HELP feature, to enable users to carry out the necessary process steps the way which the process should be executed.

Figure 4:
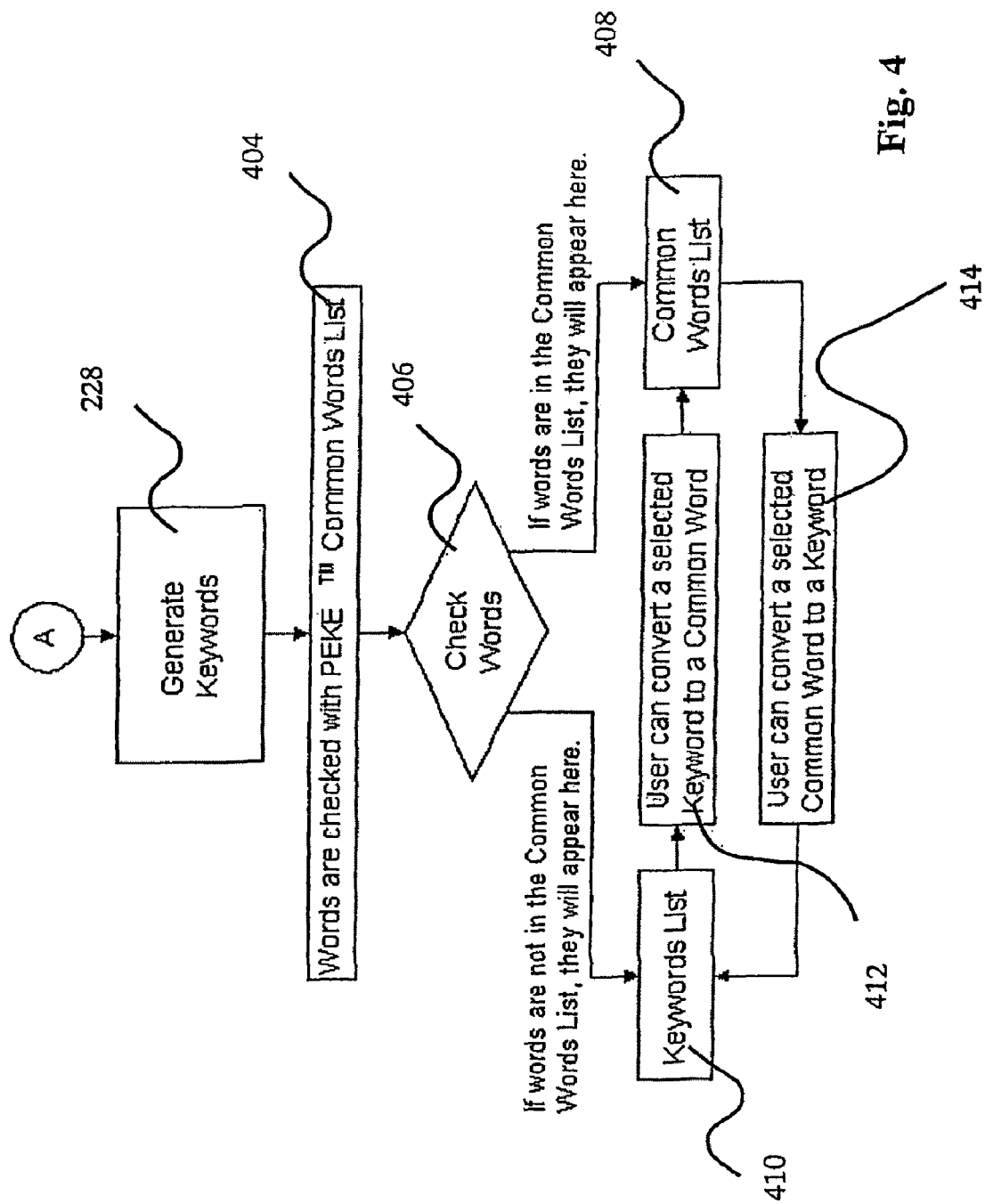
FIG. 4 is a flowchart for a Keywords Generation Process performed in the system of FIG. 1.
Figure 5:
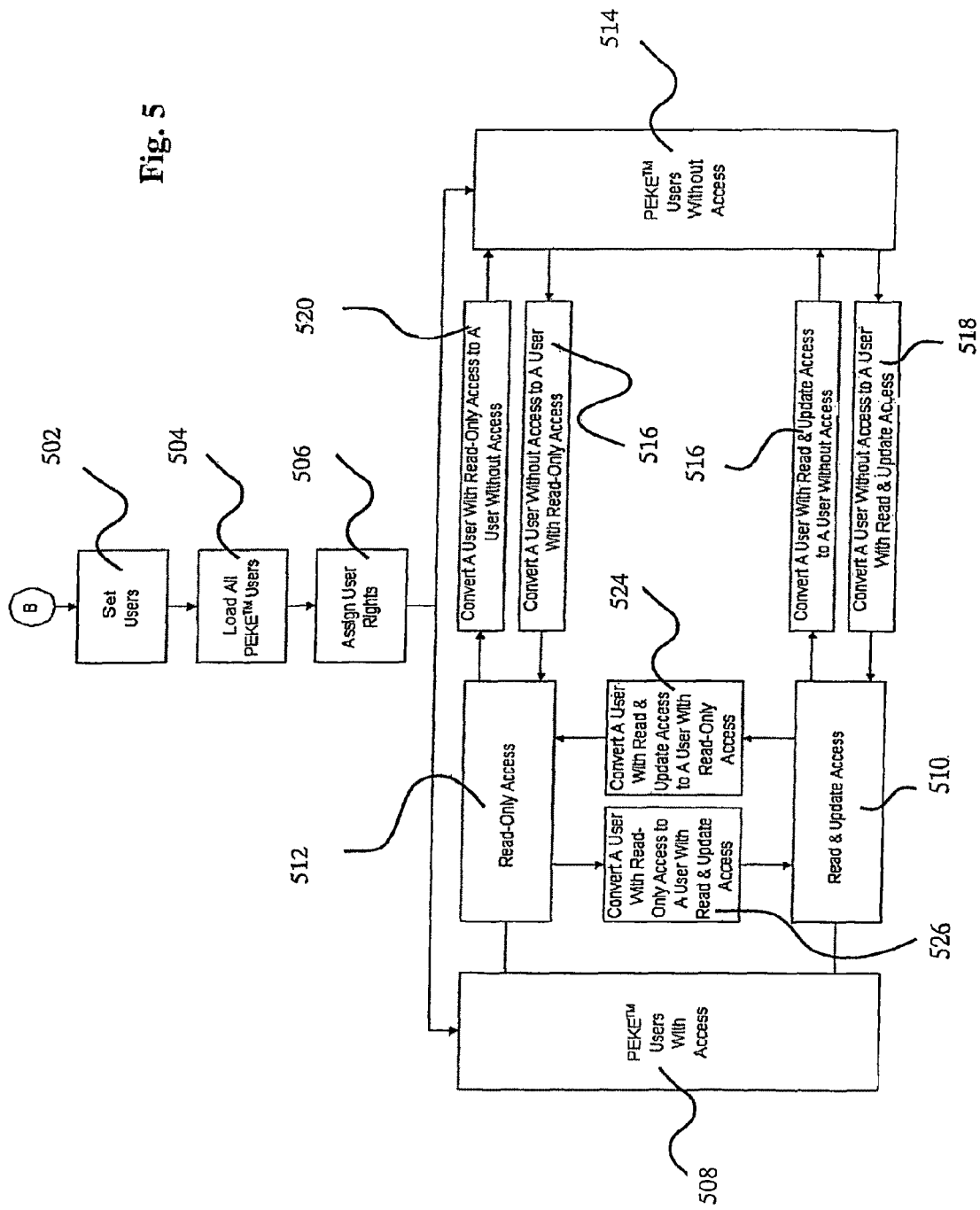
FIG. 5 is a flowchart for a Set Users Process performed in the system of FIG. 1.

Clicking on the "Generate Keywords" button 304 instructs the system to generate in a step 402 in the Keywords Generation Process 228 according to a flowchart shown in FIG. 4 a list of keywords to be linked to the document created. In the case of text documents that are readable by the system as text, the system then proceeds to compare all the various keywords in the given Text Document to a "Common Words List" 306 within the system in steps 404 and 406. All words found in the "Common Words List" 306 are then dropped from the given text document in a step 408, with the system retaining the remaining words from the text document as keywords in a Keywords List 308 in a step 410. The "Common Words List" 306 is a dynamically evolving list that grows and shrinks through time depending on future user actions. Take for example if after the Keywords Generation Process 228 has been completed for a given document say, the word "risk" was not previously part of the "Common Words List" 306, hence going through the process, the system would have classified the word "risk" as a keyword. Now suppose the user determines that the word "risk" should be considered a Common Word and not a Keyword. The user should simply click on a "Remove Keyword" button 310 to move the word "risk" from the Keywords List 308 to the Common Words List 306 in a step 412. This step in the process has not only helped the system to remove the word "risk" as a Keyword for this particular document, but in fact, it has also allowed the Common Words List 306 to evolve dynamically to include the word "risk" as a Common Word from now onwards. As such, the word "risk" would then henceforth in the Keywords Generation Process 228 be considered a Common Word and not appear as a Keyword, until further action is performed by a user to reverse the above action and move the word "risk" out from the Common Words List 306 to the Keywords List 308 using an "Add Keyword" button 312 in a step 412. In other words, the system adopts a dynamically evolving Common Words List Growth Processing Methodology to help generate an initial Keywords List 308 for the case of readable text documents, which can then be fine-tuned by the user concerned.

For the case of non-readable text or graphic documents, the user has to manually provide keywords that should be linked to the document captured. This completes the Keywords Generation Process 228, and at the same time, enabling the "Set users" button 314 to allow the user to proceed with the Set Users Process 230 in the Document Creation and Storage Process according to the flowchart shown in FIG. 5.

Clicking on the "Set users" button 314 brings on the "Users" Tab-sheet on a Document Capturing Screen (not shown) in steps 502 and 504. On this tab, the Document Creator can specify which users are to be allowed access rights to the document created and which rights specifically will apply to the authorized users in a step 506. The system allows in a step 508 for two types of access rights to be set, namely Full (Read and Update) Access in a step 510 and Read-only Access in a step 512. All other users who do not have any of these access rights in a step 514 will be unable to view the created document. These users can however request permission from the Document Creator to view the created document, and the Document Creator may grant any or all of the two types of access rights accordingly in steps 516 and 518. The Document Creator can also revoke any or all of the two types of access rights accordingly in steps 520 and 522, and transform one type of access rights to the other accordingly in steps 524 and 526.

To complete the Document Creation and Storage Process, the user must click on the "Save" button at the bottom of the Document Capturing Screen, otherwise all work done will be wasted.

Document Search and Retrieval Process

Figure 6:
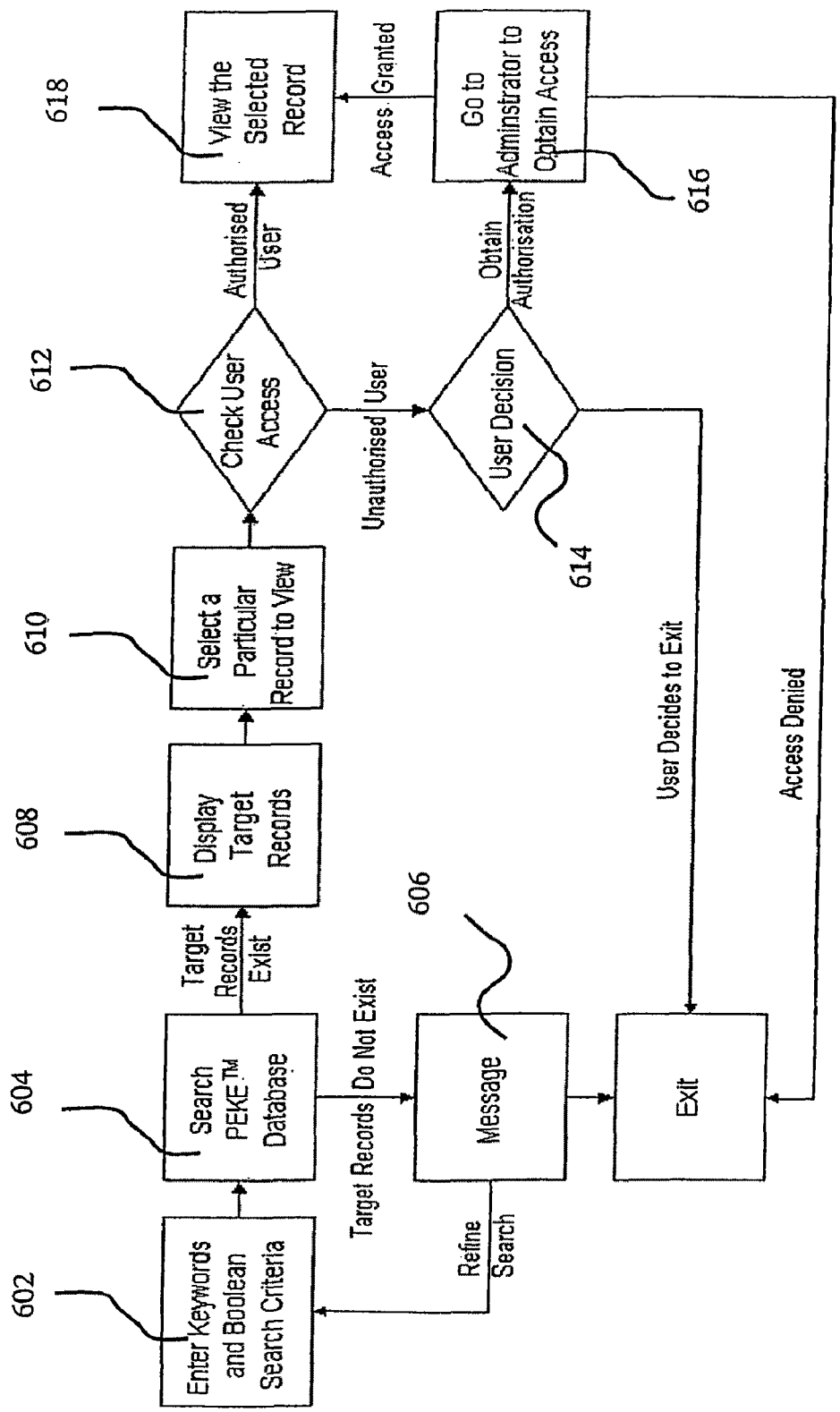
FIG. 6 is a flowchart for a Document Search and Retrieval Process performed in the system of FIG. 1.

With reference to the flowchart in FIG. 6, the Document Search and Retrieval Process is described hereinafter. A search engine that the system provides to its users utilizes the Boolean Logic Approach to specifying search criteria in this process. When a user wishes to search for a particular document or a class of related documents, the user is allowed to specify keywords in a step 602 that are expected to be found within the target document record(s). The user has the ability to further specify whether some of the keywords have to be found collectively within a document record for the document record to be considered a target document record or as long as one of the keywords is found within a document record, that document record is considered on target. As an example, suppose the user is only interested in document records that contain the words "Prime Minister" and the words "England" or "France", the user can then specify that the target document records must either contain "Prime Minister" and "England" or "Prime Minister" and "France". If either of these two Boolean conditions does not hold, then a "tested" document record is not considered on target.

In addition to the above, the system allows its users to specify how the above search process should be carried out in terms of "testing" records for suitability. The users can specify whether the Boolean Logic Word test should apply only to the Titles and Sub-Titles in Document Records, or only to the Keywords List linked to the Document Record or to both.

Once the above processes have been carried out, the user can then decide if the target documents exist by instructing the system to search the system database in a step 604. If no target document record(s) are found and this is indicated to the user, the user should specify new search criteria and run the search process again in a step 606. Otherwise a list of target document record(s) are displayed in a step 608 from which the user selects a target document record to view in a step 610.

To view a document from the list of target documents meeting the search criteria, as part of requirements of the Security Support Subsystem which is described in greater detail hereinafter, the user is required to have the appropriate access rights which is checked by the system in a step 612. Otherwise the system will not allow the user to view the document. If the appropriate access rights have not been previously assigned to the user, the user must then obtain in a step 614 the appropriate access rights from either the Document Creator or the Administrator in a step 616.

Once the appropriate access rights have been obtained or earlier affirmed in the step 612, the user can then proceed to double click on the desired target document to view the selected document record in a step 618.

Directory Record Creation and Storage Process

The Directory Management Module allows users to manage directory information on companies and individuals. In the case of company directory records, they have to contain at least the name and designation of an individual working with or associated with the company. In the case of individuals, the user would simply designate the Company Name field to "Personal" or to any other grouping name the user prefers. This allows the Directory Record type to be consistent throughout an entire Directory Record Database, which is part of the system database specific to the Directory Management Module.

Figure 7:
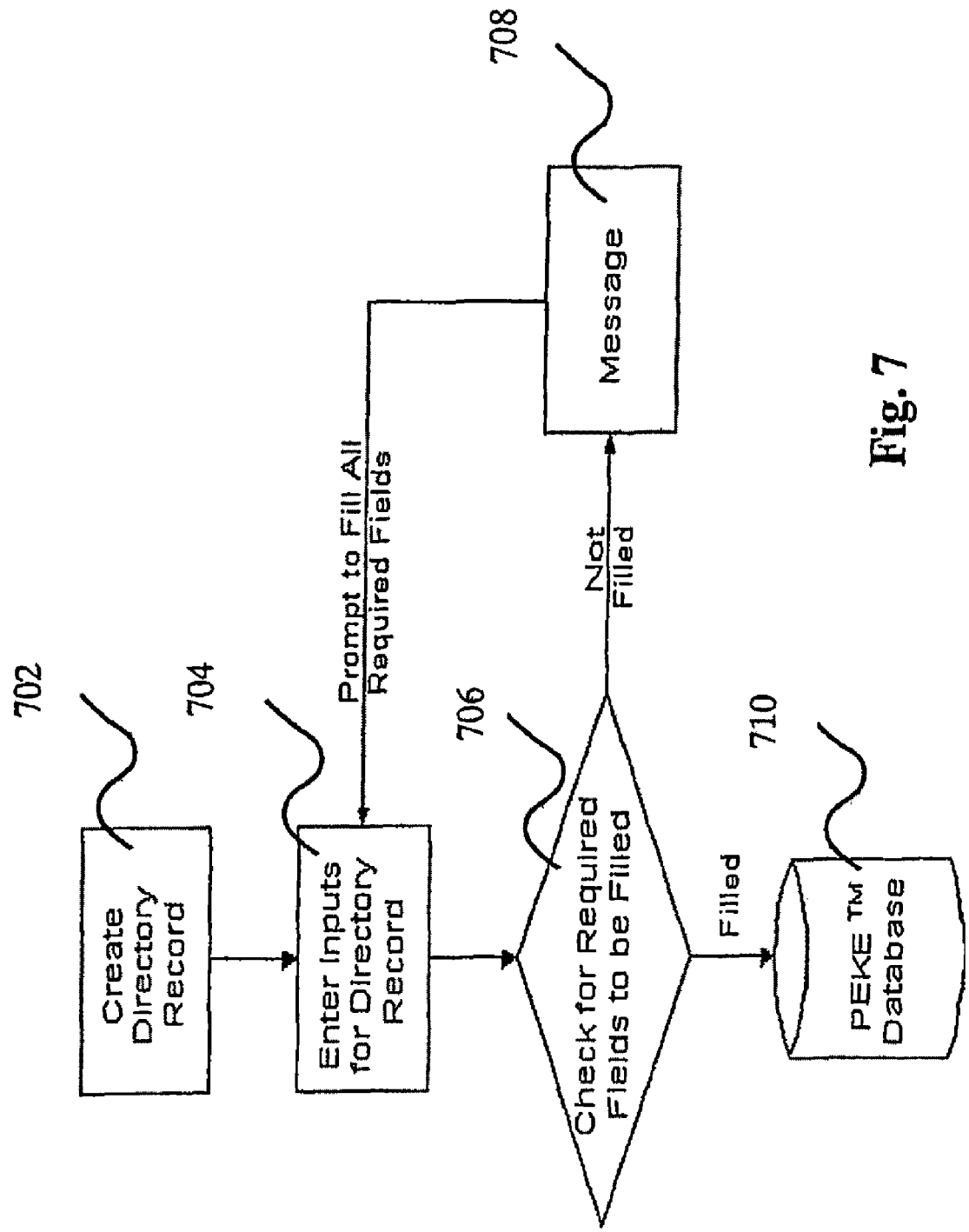
FIG. 7 is a flowchart for a Directory Record Creation and Storage Process performed in the system of FIG. 1.

With reference to the flowchart in FIG. 7, the Directory Record Creation and Storage Process is described hereinafter. To create a Directory Record in a step 702, the user has to provide information on certain mandatory fields in a step 704 and if these fields are found missing in a step 706, the system will prompt the user to provide the requisite information in a step 708. Otherwise the system will not allow the record to be captured into the Directory Record Database in a step 710.

To facilitate easy access, the system also allows its users to group Directory Records together by specifying a Group Name and the Directory Records that belong to a Group Record. For example, if a number of the companies which have been captured under the Directory Management Module are candidates for a marketing push for a particular product, then the user can create a group with the name say "Marketing (Product 1)" and in that group, include all the Directory Records of all the companies which would be suitable target clients. This grouping process also allows the user to use this easy access function within the system for other purposes. For example, if the user now wishes to generate address labels for each of the members of the group "Marketing (Product 1)", the user can easily specify the address label creation for the group, without needing to go through each Directory Record one at a time. The user must save all created Directory Records and Grouping Records. Otherwise all information provided will be lost.

Directory Record Search and Retrieval Process

Figure 8:
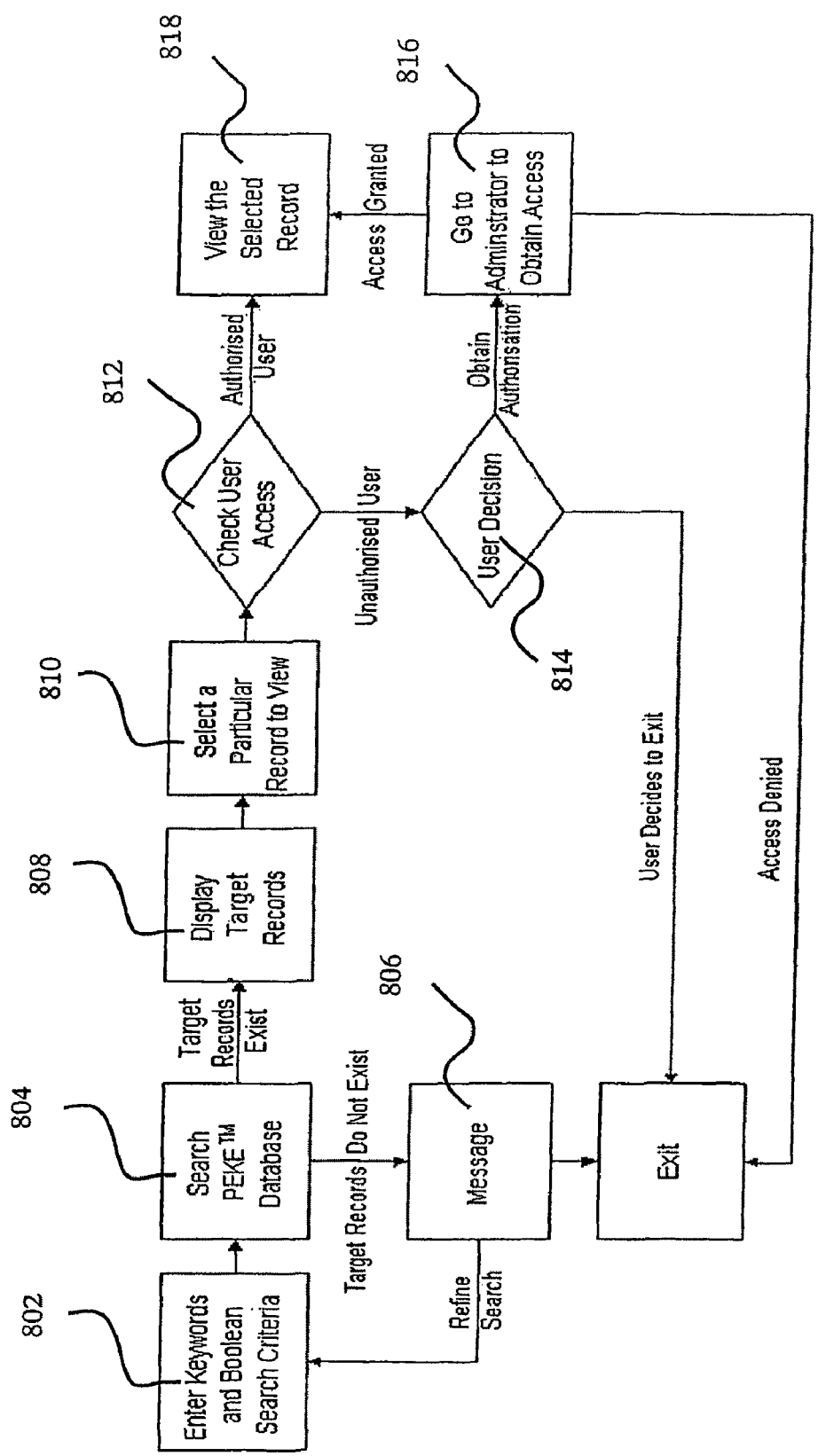
FIG. 8 is a flowchart for a Directory Record Search and Retrieval Process performed in the system of FIG. 1.

With reference to the flowchart in FIG. 8, the Directory Record Search and Retrieval Process is described hereinafter. A search engine that the system provides to its users utilizes the Boolean Logic Approach to specifying search criteria in this process. When a user wishes to search for a particular Directory or Group Record, the user is allowed to specify the keywords in a step 802 that are expected to be found within the captured fields in the target Directory Record(s). The user has the ability to further specify whether some of the keywords have to be found collectively within a Directory Record for the Directory Record to be considered a target Directory Record or as long as one of the keywords is found within the fields of a Directory Record, that Directory Record is considered on target. As an example, suppose the user is only interested in Directory Records that have the Designation field containing the word "Manager" and Country field containing the words "England" or "France", the user can then specify that the target Directory Records must either have the Designation field containing the word "Manage" and the Country field the word "England", or the Designation field containing the word "Manager" and the Country field the word "France". If either of these two Boolean conditions does not hold, then a "tested" Document Record is not considered on target.

Once the above processes have been carried out, the user can then decide if the target Directory Records exist by instructing the system to search the system database in a step 804. If no target Directory Records are found and this is indicated to the user, the user should specify new search criteria and run the search process again in a step 806. Otherwise a list of target Directory Record(s) are displayed in a step 808 from which the user selects a target Directory Record to view in a step 810.

To view a Directory Record from the list of target Directory Records meeting the search criteria, as part of the requirements of the Security Support Subsystem, the user is required to have the appropriate access rights which is checked by the system in a step 812. Otherwise the system will not allow the user to view the Directory Record. If the appropriate access rights have not been previously assigned to the user, the user must then obtain in a step 814 the appropriate access rights from either the Directory Record Creator or the Administrator in a step 816.

Once the appropriate access rights have been obtained or earlier affirmed in the step 812, the user can then proceed to double click on the desired target Directory Record to view the directory information in a step 818.

Group Talk Capturing and Storage Process

The Group Talk Module allows users to engage in electronic conference calls and have such electronic conversations conducted via the enterprise communication network 102 recorded and archived in the system database.

With reference to flowcharts in FIGS. 9 and 10, the Group Talk Capturing and Storage Process are described hereinafter.

Figure 9:
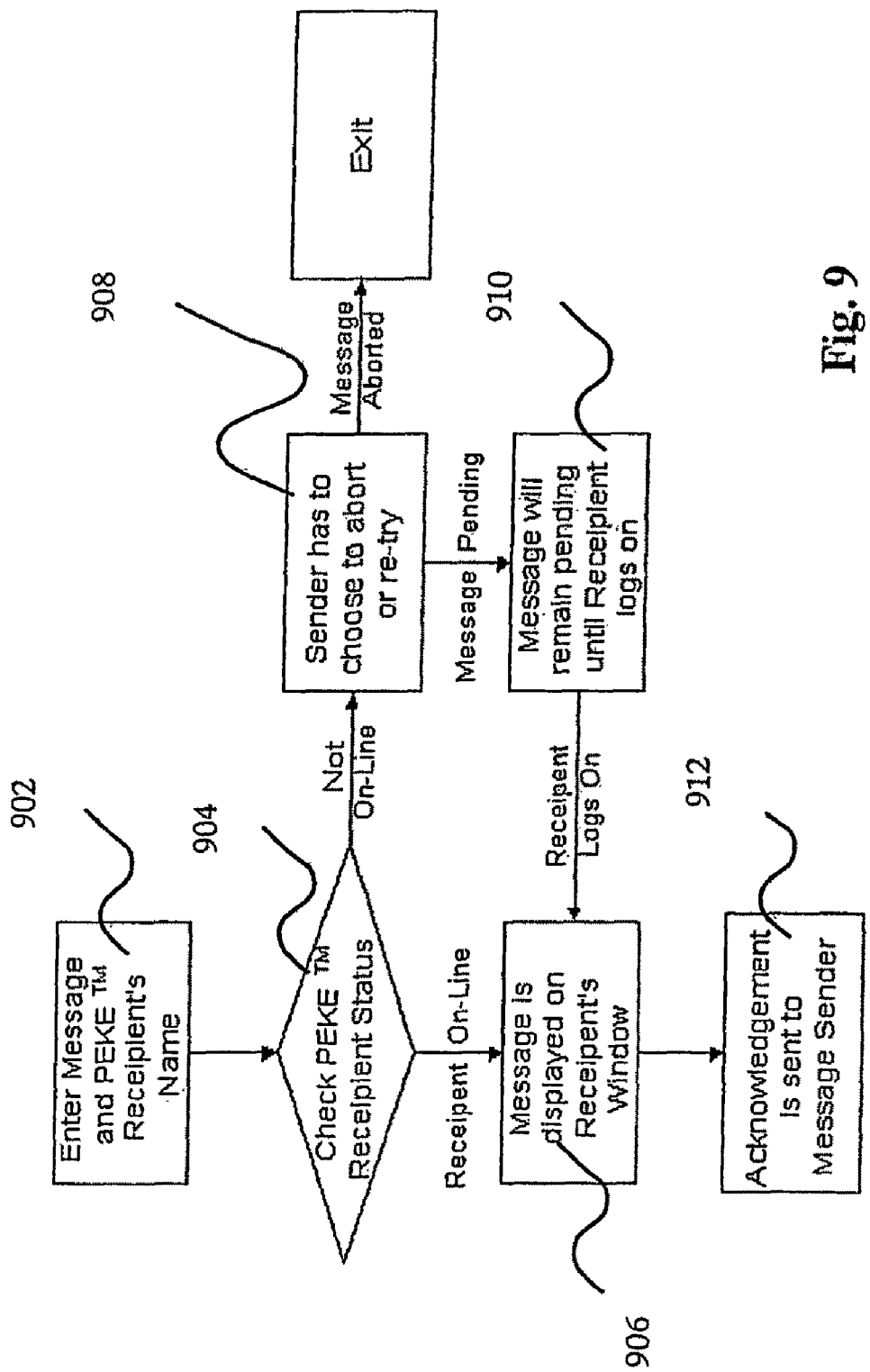
FIGS. 9 and 10 are flowcharts for a Group Talk Capturing and Storage Process performed in the system of FIG. 1.

With reference to a flowchart in FIG. 9, a process by which a Messaging System informs users or participants of a Group Talk in a messaging mode is described. A Group Talk Initiator or sender enters message and recipient's name into the system in a step 902. The system checks if the recipient is connected to the enterprise communication network 102 in a step 904. If the recipient is on-line, a message is posted on the recipient's screen in a step 906. If the recipient not on-line, the sender has a choice of deciding whether or not to proceed. If the sender decides to cancel the message in a step 908, then the process ends. If the sender wishes the message to remain pending in a step 910, the message will remain pending in the system and the moment the recipient logs in, the message will be shown. In all cases, an acknowledgement message will be shown in a step 912.

The Messaging System is also capable of broadcasting to all recipients who are participating in the Group Talk in a broadcasting mode. In the broadcasting mode, the Messaging System will operate in exactly the same way as in the messaging mode, except that the sender indicates more than one recipient, and the same message is broadcast to all recipients simultaneously.

Figure 10:
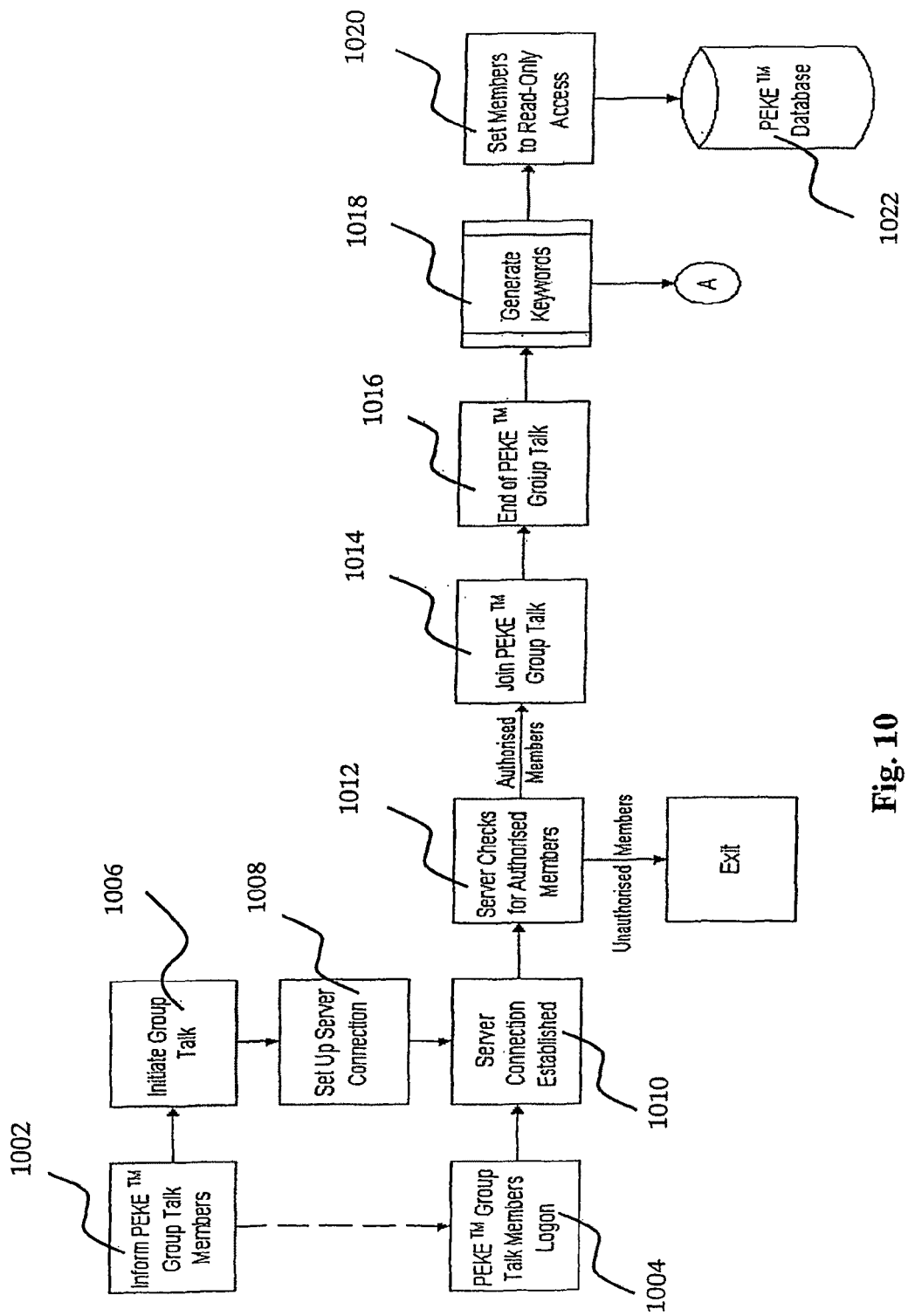

With reference to a flowchart in FIG. 10, a process by which the Group Talk Module facilitates a Group Talk is described. The Group Talk Module requires user rights to be set by a Group Talk Initiator that in turn specifies which users are allowed into a Group Talk. These users will then be alerted by the Messaging System in a step 1002 that they need to go on-line at a specified time to join the Group Talk when they logon to the system in a step 1004. The Messaging System is a multi-purpose messaging system that may be used by users in general for other purposes as well.

At the initiation of a Group Talk in a step 1006, the Group Talk Initiator has to provide the system with Topic, Sub-Topic and Title in relation to the Group Talk. As with the Document Management Module, if the Topic and/or Sub-Topic cannot be found, the Group Talk Initiator has to create these before continuing with the Group Talk.

The enterprise communication network 102 also has to be prepared for the Group Talk in which the service and connection host computers and application servers 106 providing the connection for the Group Talk is set up in a step 1008. In a step 1010, the connection for the Group Talk is made for the users who performed logons in the step 1004. Subsequently in a step 1012 the server checks for authorized users with appropriate user rights to participate in the Group Talk and allows those with authorization to join the Group Talk in a step 1014 at the earlier specified time.

All conversations are typed into the system and are readable by all participating members in the Group Talk in a manner similar to a conference call facility. The major advantage of this is that the entire conversation is then archived at the end of the conversation in a step 1016 into the system database as a Group Talk Record for future reference. In the same manner as in the Document Management Module, the system will then at this point generate a list of keywords to be linked to the Group Talk Record created in a step 1018 according to the Keywords Generation Process 228 described with reference to FIG. 4. The system then proceeds to perform a special Keywords Generation Process by comparing all the various words in the Group Talk Record to the Common Words List within the system. All words found in the Common Words List are then dropped from the recorded Group Talk conversation, with retaining the remaining words from the Group Talk Record as keywords. As is the case in the Document Management Module, the Common Words List is a dynamically evolving list that grows and shrinks through time depending on future user actions.

Continuing in the Group Talk archiving process, the system automatically sets the archived Group Talk Record to read-only status for all Group Talk participants in a step 1020, i.e., this security level is set to prevent tampering and preserve authenticity of the archived Group Talk Record. Only Group Talk members involved in the conversation have an automatic right to read the archived Group Talk Record; however, the initiator of the Group Talk conversation can also assign read-only rights to other users if necessary.

Group Talk Record Search and Retrieval Process

Figure 11:
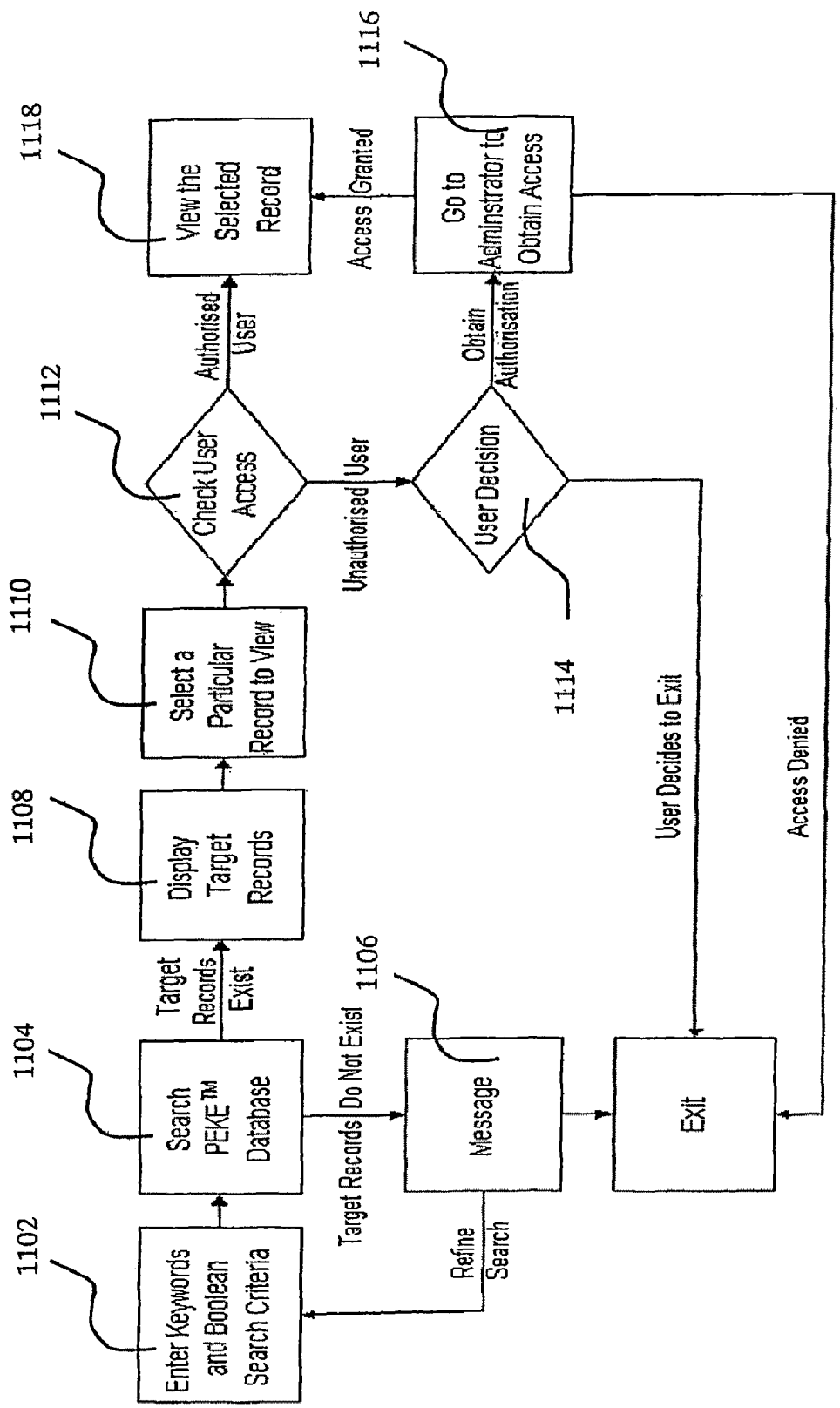
FIG. 11 is a flowchart for a Group Talk Record Search and Retrieval performed in the system of FIG. 1.

With reference to the flowchart in FIG. 11, the Group Talk Record Search and Retrieval Process is described hereinafter. A search engine that the system provides to its users utilizes the Boolean Logic Approach to specifying search criteria in this process. When a user wishes to search for a particular Group Talk Record or a class of related Group Talk Records, the user is allowed to specify the keywords in a step 1102 that are expected to be found within the target Group Talk Record(s). The user has the ability to further specify whether some of the keywords have to be found collectively within a Group Talk Record for the Group Talk Record to be considered a target Group Talk Record or as long as one of the keywords is found within a Group Talk Record, that record is considered on target. As an example, suppose the user is only interested in Group Talk Records that contain the words "Prime Minister" and the words "England" or "France", the user can then specify that the target Group Talk Records must either contain "Prime Minister" and "England", or "Prime Minister" and "France". If either of these two Boolean conditions does not hold, then a "tested" Group Talk Record is not considered on target.

In addition to the above, the system allows its users to specify how the above search process should be carried out in terms of "testing" records for suitability. The users can specify whether the Boolean Logic Word test should apply only to the Titles and Sub-Titles in Group Talk Records, or only to the Keywords List linked to the Group Talk Record or to both.

Once the above processes have been carried out, the user can then decide if the target Group Talk Records exist by instructing the system to search a system database in a step 1104. If no target Group Talk Records are found and this is indicated to the user, the user should specify new search criteria and run the search process again in a step 1106. Otherwise a list of target Group Talk Records are displayed in a step 1108 from which the user selects a target Group Talk Record to view in a step 1110.

To view a Group Talk Record from the list of target Group Talk Records meeting the search criteria, as part of requirements of the Security Support Subsystem, the user is required to have the appropriate access rights which is checked by the system in a step 1112. Otherwise the system will not allow the user to view the record. If the appropriate access rights have not been previously assigned to the user, the user must then obtain in a step 1114 the appropriate access rights from either the Group Talk Initiator or the Administrator in a step 1116.

Once the appropriate access rights have been obtained or earlier affirmed in the step 1112, the user can then proceed to double click on the desired target Group Talk Record to view the Group Talk Record in a step 1118.

Financial Instruments Data Capture and Storage Process

The system currently allows users to capture and archive key financial market instrument prices and information in markets such as Interest Rate Markets, Foreign Exchange Markets, Equity Markets, and Commodity Markets.

The Interest Rate Markets relate to Money Market Deposits, Money Market Swaps, Interest Rate Futures, Interest Rate Swaps, Cross Currency Swaps, Bond Prices, Implied Yields, Implied Modified Durations, Convexity, Caps, Floors and Swaptions Volatility Surfaces.

The Foreign Exchange Markets relate to World Foreign Exchange Spot Rates and World Foreign Exchange Volatility Surfaces, and the Equity Markets relate to World Equity Spot Rates and World Equity Volatility Surfaces. The Commodity Markets relate to World Commodity Spot Rates and World Commodity Volatility Surfaces.

The system is also scalable so that as markets evolve, new instrument(s) and market data areas can be dealt with under the Financial Instrument Data Capture and Storage Process.

For the Interest Rate Markets, in addition to capturing and archiving the financial information, the system also uses the data captured to process and generate both Yield and Discount Factor Curves as shown in FIGS. 12 to 15 for the various currencies captured within the system database. These Discount Factor Curves are especially useful for analyzing future cash flow from a present value perspective and also allow users to compute Forward Interest Rates.

Definitions of Yield and Discount Factor curves and the methodology employed by the system in the Yield and Discount Factor curve generating process are described hereinafter.

An n-year zero-coupon yield is the interest rate earned for n-years without any interim cash flow. A zero-coupon Yield curve is then defined as a collection of connected discrete yields at a given number of tenor points. A discount factor for a given tenor is simply the "today's" or spot price of a zero-coupon $1 bond with the corresponding tenor. A Discount Factor curve is then defined as a collection of connected discrete discount factors at a given number of tenor points.

While there are several conventions in the financial markets, the system is preferably configured to quote the yields for all currencies based on the 365 days in a year basis (regardless of leap years) and assuming annual compounding.

Yield and Discount Factor curves can be generated using inputs from several instruments. The system preferably uses inputs from money market deposits, money market swaps, futures, long-term interest rate swaps and cross currency swaps.

Figure 12:
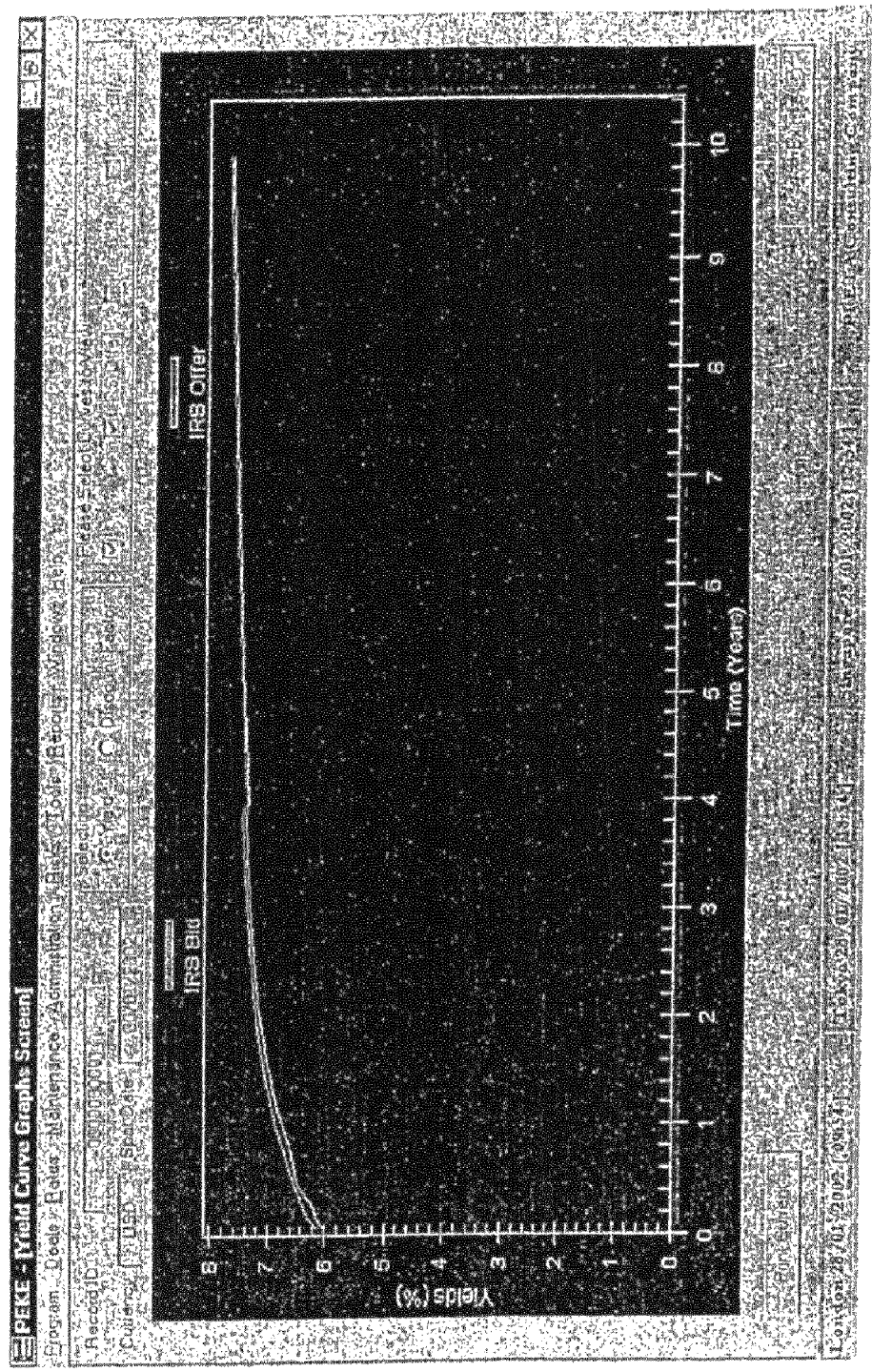
FIGS. 12 to 15 are Yield and Discount Factor Curves generated for various currencies captured by the system of FIG. 1.
Figure 13:
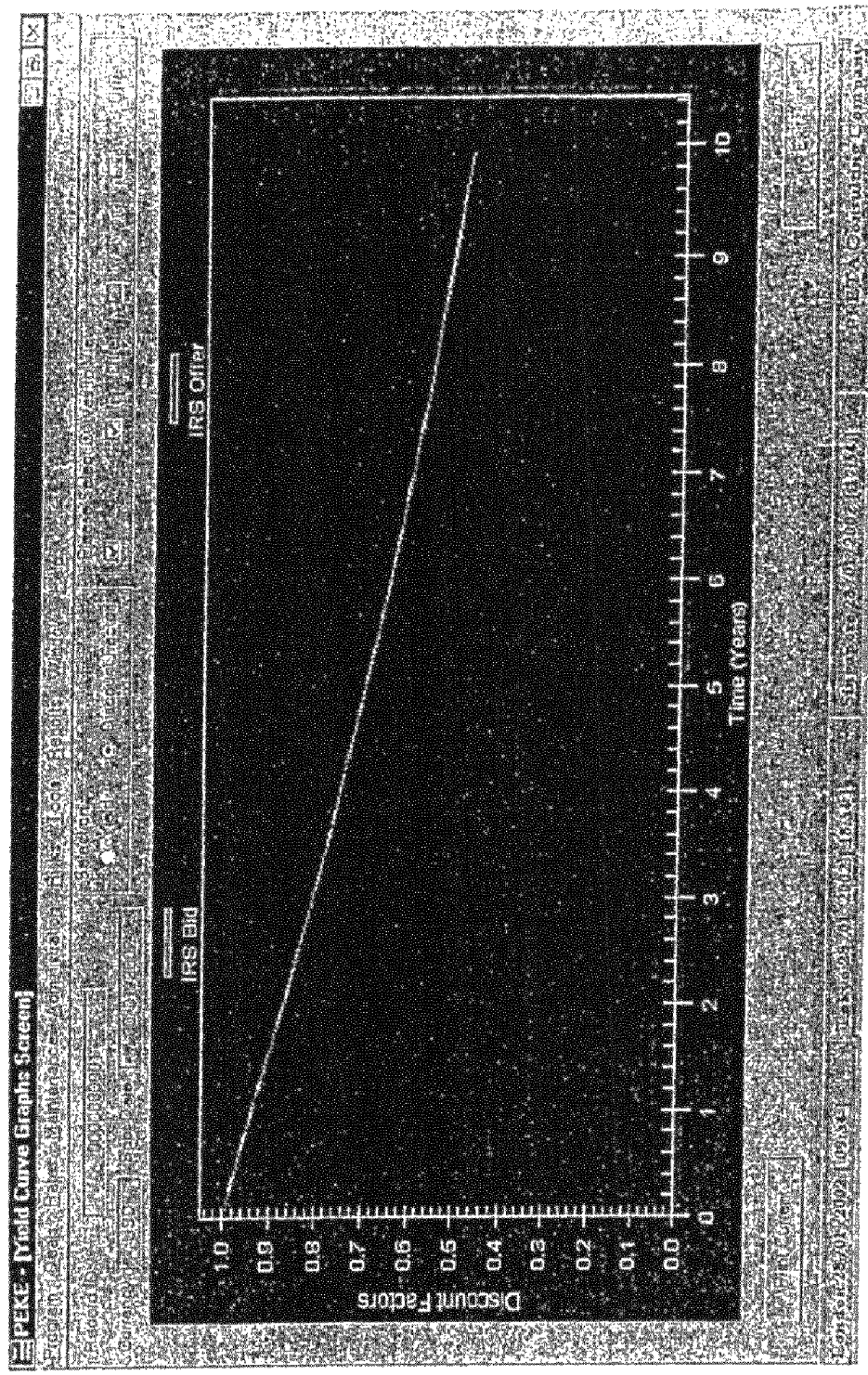
Figure 14:
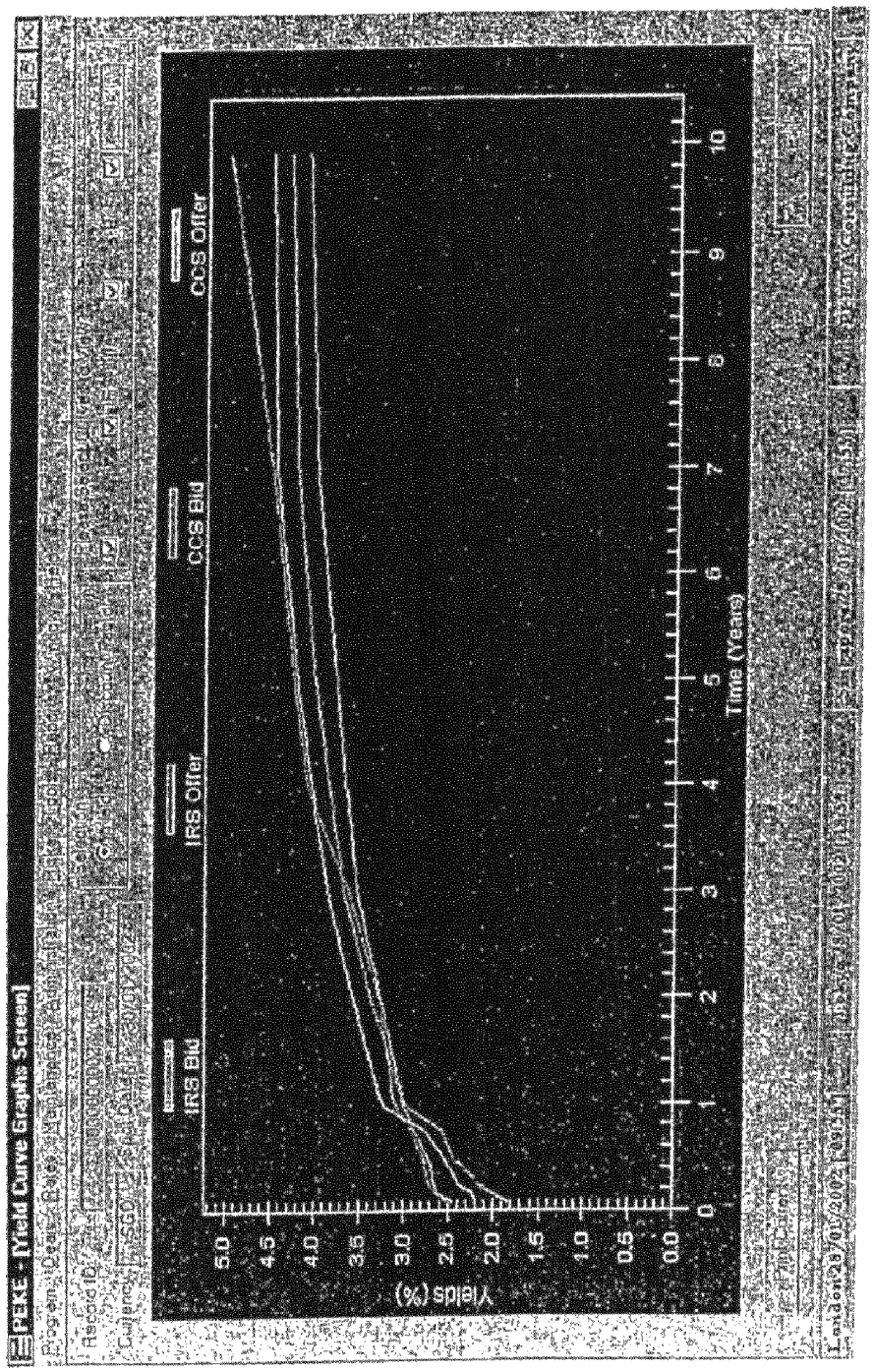
Figure 15:
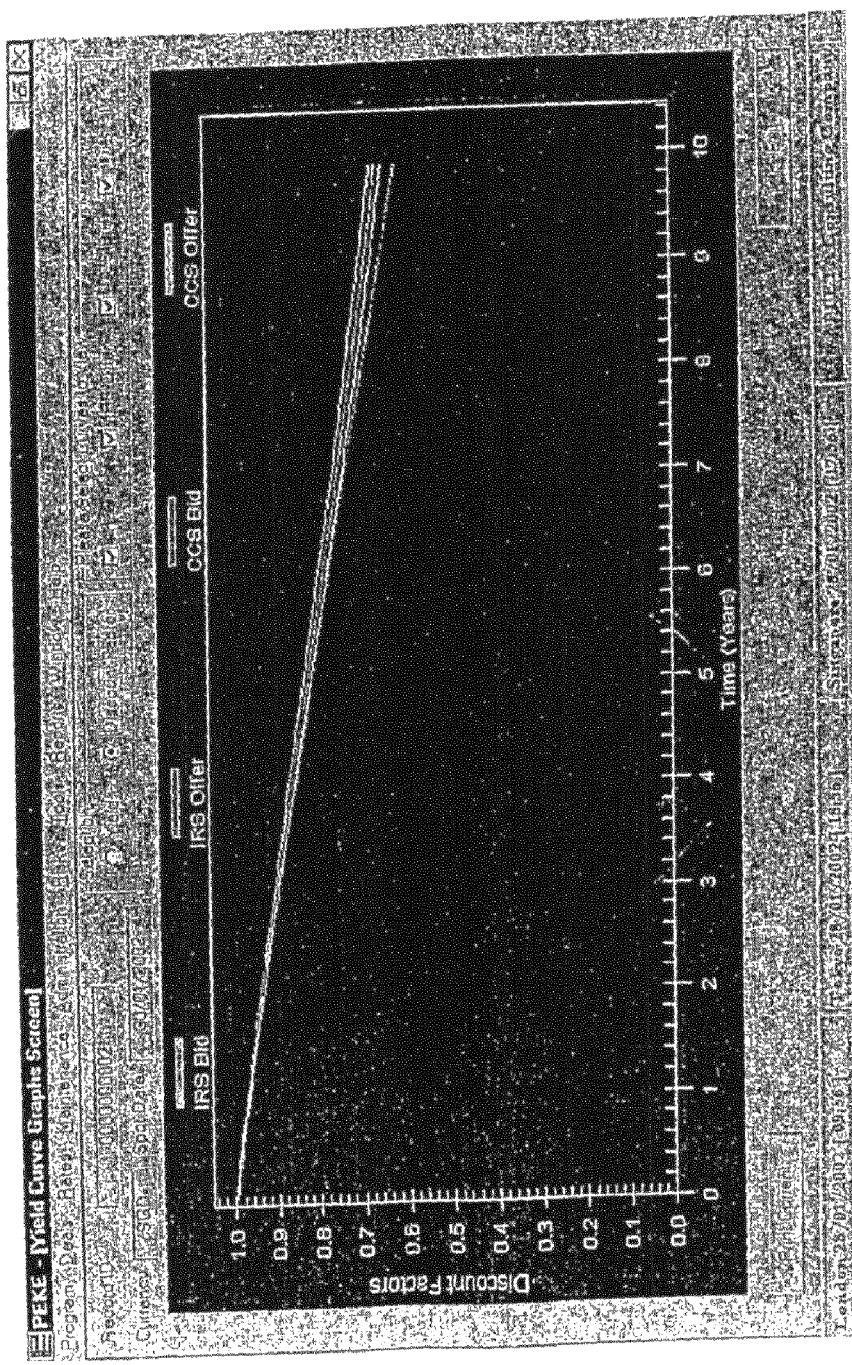

For each of the currencies other than the USD, for example the Singapore dollar as shown in FIGS. 14 and 15, the system generates two types of Yield and Discount Factor curves, namely an IRS ("Interest Rate Swap") curve and a CCS ("Cross Currency Swap") Curve. For the USD however, as shown in FIGS. 12 and 13, the system generates only one type of Yield and Discount Factor curve, namely the IRS curve.

The IRS Curve is generated using money markets deposits, futures (for some of the currencies) and long-term interest rate swaps. The CCS Curve on the other hand is generated using money market swaps (which are quoted against the USD), futures (for some of the currencies) and long-term cross currency swaps (which are quoted against the USD). The method of generating a separate CCS curve to price cross currency interest rate structures is an advantage afforded by the system. Almost all market participants price their interest rate instruments using only one type of curve. They simply make adjustments or "twitch" to the curve accordingly to price cross currency interest rate instruments. A market participant needs to be fairly expert to price instruments in such a way. The purpose of creating this "new" type of curve is to allow a constant maintenance of a curve which can be readily used to price cross currency interest rate structures, rather than requiring the user to constantly have to make adjustments in the usual case The IRS Curves are used primarily for valuing single base currency interest rate instruments, whilst the CCS Curves are used for valuing cross currency interest rate instruments.

Both types of curves are preferably generated using the standard "bootstrapping" methodology. However, to build the CCS curve, some additional steps are taken by the system. The system has to first convert the money market swap rates to implied base currency deposit rates from USD money market deposit rates. For some currencies, Cross Currency Swap rates quoted against the USD already exist. If they do not exist directly, then these rates are obtained from the combination of the base currency interest rate swap rates and the basis risk quotes for USD/Base Currency. Once these rates have been computed, the regular "bootstrapping" methodology (as used in building the IRS curves) is applied using the implied money market deposit rates, futures (for some of the currencies) and the cross currency swap rates.

In order to determine non-grid points, the Exponential Interpolation technique is used on the Discount Factor curve, whilst for the Yield curve, the simple Linear Interpolation technique is applied.

For each of the types of curves, i.e., the IRS or the CCS, the system maintains a bid and offer curve. In other words, with the exception of the USD currency that only has the IRS bid and offer curves, all other currencies have both the bid and off IRS and the bid and offer CCS curves.

Financial Data Search and Retrieval Process

The system allows users to retrieve records of all historical data on financial instrument prices captured and their respective volatility surfaces by simply choosing the date on which the required data resides and double clicking on the desired data record line to bring out a detailed data capture screen showing details of the financial instrument price records captured.

The system also provides users with the ability to graph and analyze historical data on financial instrument prices and related implied market rates from the historical data captured.

Security Support Subsystem

The Security Support Subsystem is a comprehensive built-in password-driven user access matrix security subsystem hereinafter known as an Access Matrix. The Administrator is in full control of all user logins and access rights and has full flexibility in dividing users into as many User Groups as required, depending on the organization's functional set-up and dependencies.

The Administrator when creating a new User Group has to specify the properties of the Access Matrix for the User Group. The users will then belong to the various User Groups, with each user belonging to one and only one User Group for security purposes. The Access Matrix is the main controller component of access rights for a particular User Group and hence the individual user's access to the various screens discussed hereinafter.

Screens provided by the system for facilitating user access to the modules and subsystems, an example of which is shown in FIG. 3, are divided basically into a number of sub-categories. On most of these screens, Date/Time Stamps and User ID of the user responsible for generating the action are provided as a standard system security feature. Such screen sub-categories include Administrator Control Screens, Market Rate Input Screens, Market Rate Menu Screens, Knowledge and Information Management Screens, Records Listing Screens, and Maintenance Screens.

The Administrator Control Screens provide the Administrator with full control of the system. They allow the Administrator to create new user accounts, set user access rights, and to perform certain settings to the system that only the Administrator is allowed to do. For example, the Administrator is the only authorized person who is able to change the World Clock settings and display format. This is done for added system security.

The Market Rate Input Screens allow data entry personnel to provide market rate inputs into the system. Live Feeds from Data Feed Providers can be automatically fed into the system if required. However to ensure data integrity and reliability, it is preferred that a dedicated data entry personnel is assigned to make the inputs into the system from the Data Feed Providers.

The Market Rate Menu Screens are primarily for maintenance purposes. They provide an authorized user with a means of retrieving historical market data records. An authorized user can also make amendments to incorrect data to ensure that data captured and stored in the system database is "clean" and reliable.

The Knowledge and Information Management Screens form the Front End sub-system. The management of knowledge and information can be carried out through one of these screens.

The Records Listing Screens are primarily maintenance purposes screens for all records. They provide authorized users with means of reviewing and retrieving captured records. They also provide the user with a summary of the various records captured within the system. Additional information can be obtained by clicking on the desired record to retrieve the actual record.

The Maintenance Screens are primarily maintenance purposes screens. They provide an authorized user with a means of performing actions that help in the maintenance of the system. For example, holiday capturing functions are performed through these maintenance screens.

The Access Matrix is only accessible to the Administrator and allows the Administrator to grant, read and update access rights or any combination of these control functions of the various screens simultaneously to one or more User Groups via a matrix, an example of which is shown in Table 1.

TABLE 1

|  | Screen 1 | | | Screen 2 | | |
| --- | --- | --- | --- | --- | --- | --- |
|  | Read | Create | Update | Read | Create | Update |
| User Group 1 | Yes | No | No | Yes | Yes | Yes |
| User Group 2 | Yes | Yes | Yes | No | No | No |
| User Group X | Yes | Yes | Yes | Yes | Yes | Yes |

For each User Group, the Administrator can assign various access rights/controlling functions through the matrix.

A process by which the Administrator uses the Access Matrix is described in detail hereinafter. The Administrator first selects a User Group via the Access Matrix. The Administrator can view one or more User Groups at the same time. The Administrator can also do the same in respect of individual users.

The Administrator then indicates which access rights/controlling functions shall be granted to that User Group.

The Administrator repeats the foregoing steps for other User Groups.

As and when changes are required to the access rights/controlling functions, the Administrator will enter and amend accordingly.

Interfaces

Through the gateways 108 the system can support interfaces to external systems as part of the system integrated-processing architecture. For example, the system can be set up to obtain live market rate feeds via Excel-supported Data Feed providers like Reuters or Bloomberg. The data entry personnel simply have to customize the proprietary spreadsheets provided together with the system according to the various desired sources of inputs, and the system will then import the data into the system by a simple click of a button. Alternatively, automation of this whole process (if preferred) can be arranged.

In the foregoing manner, a system for acquiring, sharing and managing knowledge and information within an organization is described. Although only a number of embodiments of the invention are disclosed, it will be apparent to one skilled in the art in view of this disclosure that numerous changes and/or modification can be made without departing from the scope and spirit of the invention.

The invention claimed is:

1. A computer implemented system for enterprise knowledge management of an organization, the computer performing the following functions, comprising:
   a document management module to enable users within an organization to create, archive and manage documents in records for future reference and usage;
   a directory management module to enable users within the organization to create, archive and manage directory information of an organization's external contacts in records for future reference and usage;
   a group talk module to enable users within the organization to engage in electronic discussions and communications and to capture and archive the respective electronic communication in records for future reference and usage;
   a financial markets module to enable users within the organization to capture, archive and manage financial data and information in records for future reference and usage; and
   a plurality of system processes; wherein one or more of the plurality of system processes are utilized with one or more of the document management module, the directory management module, the group talk module and the financial markets module to intelligently capture, archive, manage, search, and retrieve information records within an organization, wherein a Document Creation and Storage Process provides an autogenerated list of keywords, wherein the keywords together with saved associated documents provide for easy search and retrieval of the desired documents, wherein the keywords are generated by comparing all keywords in a given document to a common list, dropping all the words found in the common list, and retaining the remaining words as keywords.

2. The computer implemented system of claim 1 where the system processes include, a Document Creation and Storage Process, a Document Search and Retrieval Process, a Directory Record Creation and Storage Process, a Directory Record Search and Retrieval Process, a Group Talk Capturing and Storage Process, a Group Talk Record Search and Retrieval Process, a Financial Markets Instrument Data Capture and Storage Process and a Financial Markets Data Search and Retrieval Process.

3. The computer implemented system of claim 1, wherein a creator of records assigns user access rights to control access to records created with the document management module, the directory management module, and the group talk module.

4. The computer implemented system of claim 1, wherein in the document management by a document creator module, when documents are first created they are categorized according to topic, sub-topic and/or title.

5. The computer implemented system of claim 1, wherein in the directory management module a plurality of directory information fields are captured within each record by a directory record creator, wherein the fields include a company name field, a contact person field and a designation field.

6. The computer implemented system of claim 5, wherein the directory record creator also captures additional fields related to the contact person, wherein the additional fields includes, the full name, the address, the telephone number, facsimile number and email address of the contact person.

7. The computer implemented system of claim 1, wherein in the group talk module, when a group talk process is initiated by a group talk initiator, the group talk initiator provides the topic, sub-topic and/or title in relation to the group talk session.

8. The computer implemented system of claim 7, wherein user rights are set by the group talk initiators for specifying which users are allowed in the group talk.

9. The computer implemented system of claim 7, wherein an archived group talk record is automatically set by the knowledge management system to read only status for all participating group talk members.

10. A computer implemented method for enterprise knowledge management of an organization, the computer performing the following functions, comprising:
    providing a document management module to enable users within an organization to create, archive and manage documents in records for future reference and usage;
    providing a directory management module to enable users within the organization to create, archive and manage directory information of an organization's external contacts in records for future reference and usage;
    providing a group talk module to enable users within the organization to engage in electronic discussions and communications and to capture and archive the respective electronic communication in records for future reference and usage;
    providing a financial markets module to enable users within the organization to capture, archive and manage financial markets data and information in records for future reference and usage; and
    providing a plurality of system processes; wherein one or more of the plurality of system processes are utilized with one or more of the document management module, the directory management module, the group talk module and the financial markets module to intelligently capture, archive, manage, search, and retrieve information records within an organization, wherein a Document Creation and Storage Process provides an autogenerated list of keywords, wherein the keywords together with saved associated documents provide for easy search and retrieval of the desired documents, wherein the keywords are generated by comparing all keywords in a given document to a common list, dropping all the words found in the common list, and retaining the remaining words as keywords.

11. The computer implemented method of claim 10 where the system processes include, a Document Creation and Storage Process, a Document Search and Retrieval Process, a Directory Record Creation and Storage Process, a Directory Record Search and Retrieval Process, a Group Talk Capturing and Storage Process, a Group Talk Record Search and Retrieval Process, a Financial Markets Instrument Data Capture and Storage Process and a Financial Markets Data Search and Retrieval Process.

12. The computer implemented method of claim 10, wherein a creator of records assigns user access rights to control access to records created with the document management module, the directory management module, and the group talk module.

13. The computer implemented method of claim 10, wherein in the document management by a document creator module, when documents are first created they are categorized according to topic, sub-topic and/or title.

14. The computer implemented method of claim 10, wherein in the directory management module a plurality of directory information fields are captured within each record by a directory record creator, wherein the fields include a company name field, a contact person field and a designation field.

15. The computer implemented method of claim 14, wherein the directory record creator also captures additional fields related to the contact person, wherein the additional fields includes, the full name, the address, the telephone number, facsimile number and email address of the contact person.

16. The computer implemented method of claim 14, wherein in the group talk module, when a group talk process is initiated by a group talk initiator, group talk initiator provides the topic, sub-topic and/or title in relation to the group talk.

17. The computer implemented method of claim 16, wherein user rights are set by the group talk initiators for specifying which users are allowed in the group talk.

18. The computer implemented method of claim 16, wherein an archived group talk record is automatically set by the knowledge management method to read-only status for all participating group talk members.

* * * * *